United States Patent
Song et al.

(10) Patent No.: US 9,729,697 B2
(45) Date of Patent: Aug. 8, 2017

(54) ELECTRONIC DEVICE AND METHOD OF CONTROLLING THE SAME

(71) Applicant: LG ELECTRONICS INC., Seoul (KR)

(72) Inventors: Yoomee Song, Seoul (KR); Miyoung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 393 days.

(21) Appl. No.: 14/311,808

(22) Filed: Jun. 23, 2014

(65) Prior Publication Data

US 2014/0378113 A1    Dec. 25, 2014

(30) Foreign Application Priority Data

Jun. 24, 2013 (KR) ........................ 10-2013-0072366

(51) Int. Cl.
*H04M 1/725* (2006.01)
*G06F 1/16* (2006.01)
*G06F 3/01* (2006.01)

(52) U.S. Cl.
CPC ........ *H04M 1/72563* (2013.01); *G06F 1/163* (2013.01); *G06F 3/014* (2013.01); *G06F 2203/0381* (2013.01); *H04M 2250/12* (2013.01)

(58) Field of Classification Search
CPC .. G06F 1/163; G06F 2203/0381; G06F 3/014; H04M 1/12
See application file for complete search history.

(56) References Cited

U.S. PATENT DOCUMENTS

| 1,616,215 | A | | 2/1927 | Chilson | |
|---|---|---|---|---|---|
| 5,766,132 | A | * | 6/1998 | Yasukawa | A61B 5/02438 600/500 |
| 2002/0193996 | A1 | * | 12/2002 | Squibbs | H04M 1/72547 704/260 |
| 2010/0029327 | A1 | * | 2/2010 | Jee | G04G 17/045 455/556.1 |
| 2012/0075173 | A1 | * | 3/2012 | Ashbrook | G06F 3/014 345/156 |
| 2012/0082013 | A1 | * | 4/2012 | Yeung | G04C 3/002 368/274 |
| 2012/0194976 | A1 | * | 8/2012 | Golko | G06F 1/163 361/679.01 |
| 2012/0249409 | A1 | * | 10/2012 | Toney | G06F 3/017 345/156 |
| 2013/0265229 | A1 | * | 10/2013 | Forutanpour | G06F 3/014 345/158 |

FOREIGN PATENT DOCUMENTS

| EP | 1 462 880 A2 | | 9/2004 | |
|---|---|---|---|---|
| EP | 2 150 031 A1 | | 2/2010 | |
| LU | EP 1462880 A2 | * | 9/2004 | ............. G04B 37/00 |

OTHER PUBLICATIONS

European Search Report issued in Application No. 14171753.8 dated Oct. 29, 2014.

* cited by examiner

*Primary Examiner* — Qun Shen
(74) *Attorney, Agent, or Firm* — Ked & Associates, LLP

(57) ABSTRACT

An electronic device and a method of controlling the same are provided. The electronic device includes a wearable band. The electronic device is controlled to operate in a different mode depending on the way the user is wearing the band, and a user interface for each operation mode is provided. Accordingly, the electronic device with the wearable band can be easily used in various ways.

20 Claims, 24 Drawing Sheets

(a)

(b)

(a)

(b)

(a)

(b)

(c)

ELECTRONIC DEVICE AND METHOD OF CONTROLLING THE SAME

CROSS-REFERENCE TO RELATED APPLICATIONS

Pursuant to 35 U.S.C. §119(a), this application claims the benefit of earlier filing date and right of priority to Korean Patent Application No. 10-2013-0072366, filed on Jun. 24, 2013, the contents of which are incorporated by reference herein in their entirety.

BACKGROUND

1. Field

The present disclosure relates to an electronic device, and more particularly, to an electronic device with a wearable band which can be efficiently used, depending on the way the band is worn, and a method of controlling the same.

2. Background

As functions of terminals such as personal computers, laptop computers, cellular phones diversify, the terminals become multimedia players having multiple functions for capturing pictures or moving images, playing music, moving image files and games and receiving broadcasting programs.

Terminals can be categorized as mobile terminals and stationary terminals. The mobile terminals can be further comprised of handheld terminals and vehicle mount terminals according to whether users can personally carry the terminals. Conventional terminals including mobile terminals provide an increasing number of complex and various functions.

To support and enhance the increasing number of functions in a terminal, improving a structural part and/or a software part of the terminal would be desirable. As a terminal is widely used and functionality expanded, user's demands for easy access and manipulation of displayed objects increase.

BRIEF DESCRIPTION OF THE DRAWINGS

The embodiments will be described in detail with reference to the following drawings in which like reference numerals refer to like elements wherein.

DETAILED DESCRIPTION

Arrangements and embodiments may now be described more fully with reference to the accompanying drawings, in which exemplary embodiments may be shown. Embodiments may, however, be embodied in many different forms and should not be construed as being limited to embodiments set forth herein; rather, embodiments may be provided so that this disclosure will be thorough and complete, and will fully convey the concept to those skilled in the art.

An electronic device may be described below with reference to the accompanying drawings. In the following description, suffixes "module" and "unit" may be given to components of the electronic device in consideration of only facilitation of description and do not have meanings or functions discriminated from each other.

The electronic device may include a cellular phone, a smart phone, a laptop computer, a digital broadcasting terminal, personal digital assistants (PDA), a portable multimedia player (PMP), a navigation system and/or so on.

Figure 1:
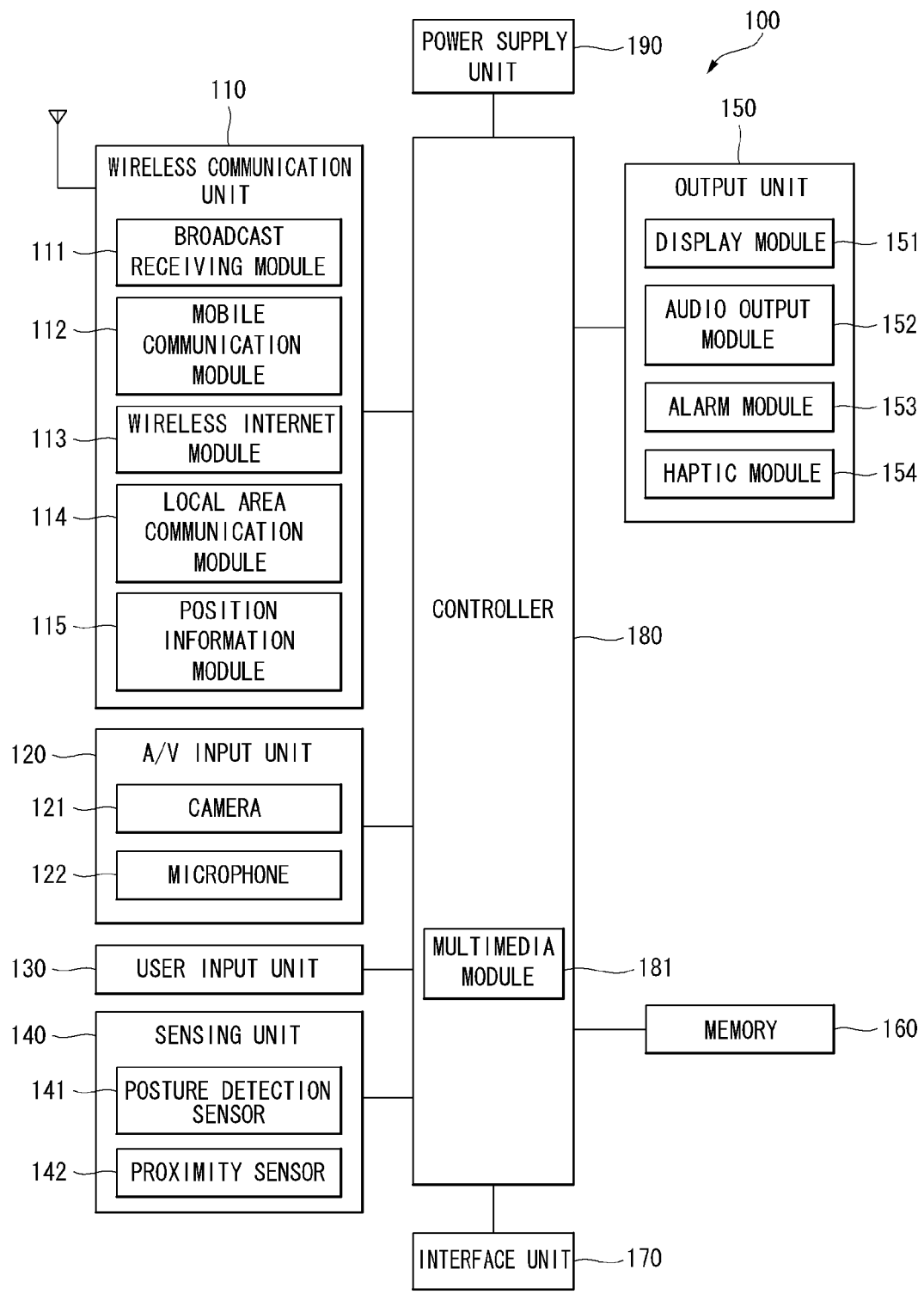
FIG. 1 is a block diagram of an electronic device according to an embodiment.

FIG. 1 is a block diagram of an electronic device according to an embodiment. Other embodiments, configurations and arrangements may also be provided. As shown, the electronic device 100 may include a wireless communication unit 110 (or radio communication unit), an audio/video (A/V) input unit 120, a user input unit 130, a sensing unit 140, an output unit 150, a memory 160, an interface 170, a controller 180, and a power supply 190. The components shown in FIG. 1 may be essential parts and/or a number of components included in the electronic device 100 may vary. Components of the electronic device 100 may now be described.

The wireless communication unit 110 may include at least one module that enables radio communication between the electronic device 100 and a radio communication system or between the electronic device 100 and a network in which the electronic device 100 is located. For example, the wireless communication unit 110 may include a broadcasting receiving module 111, a mobile communication module 112, a wireless Internet module 113, a short range communication module 114 (or local area communication module), and a location information module 115 (or position information module).

The broadcasting receiving module 111 may receive broadcasting signals and/or broadcasting related information from an external broadcasting management server through a broadcasting channel. The broadcasting channel may include a satellite channel and a terrestrial channel, and the broadcasting management server may be a server that generates and transmits broadcasting signals and/or broadcasting related information or a server that receives previously created broadcasting signals and/or broadcasting related information and transmits the broadcasting signals and/or broadcasting related information to a terminal.

The broadcasting signals may include not only TV broadcasting signals, radio broadcasting signals, and data broadcasting signals but also signals in the form of a combination of a TV broadcasting signal and a radio broadcasting signal. The broadcasting related information may be information on a broadcasting channel, a broadcasting program or a broadcasting service provider, and may be provided even through a mobile communication network. In the latter case, the broadcasting related information may be received by the mobile communication module 112.

The broadcasting related information may exist in various forms. For example, the broadcasting related information may exist in the form of an electronic program guide (EPG) of a digital multimedia broadcasting (DMB) system or in the form of an electronic service guide (ESG) of a digital video broadcast-handheld (DVB-H) system.

The broadcasting receiving module 111 may receive broadcasting signals using various broadcasting systems. More particularly, the broadcasting receiving module 111 may receive digital broadcasting signals using digital broadcasting systems such as a digital multimedia broadcasting-terrestrial (DMB-T) system, a digital multimedia broadcasting-satellite (DMB-S) system, a media forward link only (MediaFLO) system, a DVB-H and integrated services digital broadcast-terrestrial (ISDB-T) systems. The broadcasting receiving module 111 may receive signals from broadcasting systems providing broadcasting signals other than the above-described digital broadcasting systems.

The broadcasting signals and/or broadcasting related information received through the broadcasting receiving module 111 may be stored in the memory 160. The mobile communication module 112 may transmit/receive a radio signal to/from at least one of a base station, an external terminal and a server on a mobile communication network. The radio signal may include a voice call signal, a video telephony call signal or data in various forms according to transmission and reception of text/multimedia messages.

The wireless Internet module 113 may correspond to a module for wireless Internet access and may be included in the electronic device 100 or may be externally attached to the mobile terminal 100. Wireless LAN (WLAN or Wi-Fi), wireless broadband (Wibro), world interoperability for microwave access (Wimax), high speed downlink packet access (HSDPA) and so on may be used as a wireless Internet technique.

The short range communication module 114 may correspond to a module for short range communication. Further, Bluetooth®, radio frequency identification (RFID), infrared data association (IrDA), ultra wideband (UWB) and/or Zig-Bee® may be used as a short range communication technique.

The location information module 115 may confirm or obtain a location or a position of the mobile terminal 100. The location information module 115 may obtain position information by using a global navigation satellite system (GNSS). The GNSS is a terminology describing a radio navigation satellite system that revolves around the earth and transmits reference signals to predetermined types of radio navigation receivers such that the radio navigation receivers can determine their positions on the earth's surface or near the earth's surface. The GNSS may include a global positioning system (GPS) of the United States, Galileo of Europe, a global orbiting navigational satellite system (GLONASS) of Russia, COMPASS of China, and a quasi-zenith satellite system (QZSS) of Japan, for example.

A global positioning system (GPS) module is a representative example of the location information module 115. The GPS module may calculate information on distances between one point or object and at least three satellites and information on a time when distance information is measured and apply trigonometry to the obtained distance information to obtain three-dimensional position information on the point or object according to latitude, longitude and altitude at a predetermined time.

A method of calculating position and time information using three satellites and correcting the calculated position and time information using another satellite may also be used. Additionally, the GPS module may continuously calculate a current position in real time and calculate velocity information using the location or position information.

The A/V input unit 120 may input (or receive) an audio signal and/or a video signal. The A/V input unit 120 may include a camera 121 and a microphone 122. The camera 121 may process image frames of still images or moving images obtained by an image sensor in a video telephony mode or a photographing mode. The processed image frames may be displayed on a display 151, which may be a touch screen.

The image frames processed by the camera 121 may be stored in the memory 160 or may be transmitted to an external device through the wireless communication unit 110. The electronic device 100 may also include at least two cameras 121.

The microphone 122 may receive an external audio signal in a call mode, a recording mode and/or a speech recognition mode, and the microphone 122 may process the received audio signal into electric audio data. The audio data may then be converted into a form that can be transmitted to a mobile communication base station through the mobile communication module 112 and output in the call mode. The microphone 122 may employ various noise removal algorithms (or noise canceling algorithm) for removing or reducing noise generated when the external audio signal is received.

The user input unit 130 may receive input data for controlling operation of the electronic device 100 from a user. The user input unit 130 may include a keypad, a dome switch, a touch pad (constant voltage/capacitance), a jog wheel, a jog switch and/or so on.

The sensing unit 140 may sense a current state of the mobile terminal 100, such as an open/close state of the mobile terminal 100, a position of the mobile terminal 100, whether a user touches the mobile terminal 100, a direction of the mobile terminal 100, and acceleration/deceleration of the mobile terminal 100, and the sensing unit 140 may generate a sensing signal for controlling operation of the mobile terminal 100. For example, in an example of a slide phone, the sensing unit 140 may sense whether the slide phone is opened or closed. Further, the sensing unit 140 may sense whether the power supply 190 supplies power and/or whether the interface 170 is connected to an external device. The sensing unit 140 may also include a proximity sensor 141. The sensing unit 140 may sense a motion of the mobile terminal 100.

The output unit 150 may generate visual, auditory and/or tactile output, and the output unit 150 may include the display 151, an audio output module 152, an alarm 153 and a haptic module 154. The display 151 may display information processed by the mobile terminal 100. The display 151 may display a user interface (UI) and/or a graphic user interface (GUI) related to a telephone call when the electronic device 100 is in the call mode. The display 151 may also display a captured and/or received image, a UI or a GUI when the electronic device 100 is in the video telephony mode or the photographing mode.

The display 151 may include at least one of a liquid crystal display, a thin film transistor liquid crystal display, an organic light-emitting diode display, a flexible display and/or a three-dimensional display. The display 151 may be of a transparent type or a light transmissive type. That is, the display 151 may include a transparent display.

The transparent display may be a transparent liquid crystal display. A rear structure of the display 151 may also be of a light transmissive type. Accordingly, a user may see an object located behind the body (of the mobile terminal 100) through the transparent area of the body of the electronic device 100 that is occupied by the display 151.

The electronic device 100 may also include at least two displays 151. For example, the electronic device 100 may include a plurality of displays 151 that are arranged on a single face at a predetermined distance or integrated displays. The plurality of displays 151 may also be arranged on different sides.

When the display 151 and a sensor sensing touch (hereafter referred to as a touch sensor) form a layered structure that is referred to as a touch screen, the display 151 may be used as an input device in addition to an output device. The touch sensor may be in the form of a touch film, a touch sheet, and/or a touch pad, for example.

The touch sensor may convert a variation in pressure applied to a specific portion of the display 151 or a variation in capacitance generated at a specific portion of the display 151 into an electric input signal. The touch sensor may sense pressure of touch as well as position and area of the touch.

When the user applies a touch input to the touch sensor, a signal corresponding to the touch input may be transmitted to a touch controller. The touch controller may then process the signal and transmit data corresponding to the processed signal to the controller 180. Accordingly, the controller 180 may detect a touched portion of the display 151.

The proximity sensor 141 (of the sensing unit 140) may be located in an internal region of the mobile terminal 100, surrounded by the touch screen, and/or near the touch screen. The proximity sensor 141 may sense an object approaching a predetermined sensing face or an object located near the proximity sensor 141 using an electromagnetic force or infrared rays without having mechanical contact. The proximity sensor 141 may have a lifetime longer than a contact sensor and may thus have a wide application in the mobile terminal 100.

The proximity sensor 141 may include a transmission type photo-electric sensor, a direct reflection type photo-electric sensor, a mirror reflection type photo-electric sensor, a high-frequency oscillating proximity sensor, a capacitive proximity sensor, a magnetic proximity sensor, and/or an infrared proximity sensor. A capacitive touch screen may be constructed such that proximity of a pointer is detected through a variation in an electric field according to the proximity of the pointer. The touch screen (touch sensor) may be classified as a proximity sensor 141.

For ease of explanation, an action of the pointer approaching the touch screen without actually touching the touch screen may be referred to as a proximity touch and an action of bringing the pointer into contact with the touch screen may be referred to as a contact touch. The proximity touch point of the pointer on the touch screen may correspond to a point of the touch screen at which the pointer is perpendicular to the touch screen.

The proximity sensor 141 may sense the proximity touch and a proximity touch pattern (e.g., a proximity touch distance, a proximity touch direction, a proximity touch velocity, a proximity touch time, a proximity touch position, a proximity touch moving state, etc.). Information corresponding to the sensed proximity touch action and proximity touch pattern may then be displayed on the touch screen.

The audio output module 152 may output audio data received from the wireless communication unit 110 or stored in the memory 160 in a call signal receiving mode, a telephone call mode or a recording mode, a speech recognition mode and a broadcasting receiving mode. The audio output module 152 may output audio signals related to functions, such as a call signal incoming tone and a message incoming tone, performed in the mobile terminal 100. The audio output module 152 may include a receiver, a speaker, a buzzer, and/or the like. The audio output module 152 may output sounds through an earphone jack. The user may hear the sounds by connecting an earphone to the earphone jack.

The alarm 153 may output a signal for indicating generation of an event of the mobile terminal 100. For example, an alarm may be generated when receiving a call signal, receiving a message, inputting a key signal, and/or inputting a touch. The alarm 153 may also output signals in forms different from video signals or audio signals, for example, a signal for indicating generation of an event through vibration. The video signals and/or the audio signals may also be output through the display 151 or the audio output module 152.

The haptic module 154 may generate various haptic effects that the user can feel. One example of the haptic effects is vibration. An intensity and/or pattern of vibration generated by the haptic module 154 may also be controlled. For example, different vibrations may be combined and output or may be sequentially output.

The haptic module 154 may generate a variety of haptic effects including an effect of stimulus according to an arrangement of pins vertically moving against a contact skin surface, an effect of stimulus according to a jet force or sucking force of air through a jet hole or a sucking hole, an effect of stimulus of rubbing the skin, an effect of stimulus according to contact of an electrode, an effect of stimulus using an electrostatic force, and an effect according to a reproduction of cold and warmth using an element capable of absorbing or radiating heat in addition to vibrations.

The haptic module 154 may not only transmit haptic effects through direct contact but may also allow the user to feel haptic effects through a kinesthetic sense of the user's fingers or arms. The electronic device 100 may also include a plurality of haptic modules 154.

The memory 160 may store a program for operations of the controller 180 and/or temporarily store input/output data such as a phone book, messages, still images, and/or moving images. The memory 160 may also store data about vibrations and sounds in various patterns that are output from when a touch input is applied to the touch screen.

The memory 160 may include at least a flash memory, a hard disk type memory, a multimedia card micro type memory, a card type memory, such as SD or XD memory, a random access memory (RAM), a static RAM (SRAM), a read-only memory (ROM), an electrically erasable programmable ROM (EEPROM), a programmable ROM (PROM) magnetic memory, a magnetic disk and/or an optical disk. The electronic device 100 may also operate in relation to a web storage that performs a storing function of the memory 160 on the Internet.

The interface 170 may serve as a path to external devices connected to the mobile terminal 100. The interface 170 may receive data from the external devices or power and transmit the data or power to internal components of the electronic device 100 or transmit data of the electronic device 100 to the external devices. For example, the interface 170 may include a wired/wireless headset port, an external charger port, a wired/wireless data port, a memory card port, a port for connecting a device having a user identification module, an audio I/O port, a video I/O port, and/or an earphone port.

The interface 170 may also interface with a user identification module that is a chip that stores information for authenticating authority to use the mobile terminal 100. For example, the user identification module may be a user identify module (UIM), a subscriber identify module (SIM) and/or a universal subscriber identify module (USIM). An identification device (including the user identification module) may also be manufactured in the form of a smart card. Accordingly, the identification device may be connected to the electronic device 100 through a port of the interface 170.

The interface 170 may also be a path through which power from an external cradle is provided to the electronic device 100 when the electronic device 100 is connected to the external cradle or a path through which various command signals input by the user through the cradle are transmitted to the mobile terminal 100. The various command signals or power input from the cradle may be used as signals for confirming whether the electronic device 100 is correctly set in the cradle.

The controller 180 may control overall operations of the mobile terminal 100. For example, the controller 180 may perform control and processing for voice communication, data communication and/or video telephony. The controller 180 may also include a multimedia module 181 for playing multimedia. The multimedia module 181 may be included in the controller 180 or may be separated from the controller 180.

The controller 180 may perform a pattern recognition process capable of recognizing handwriting input or picture-drawing input applied to the touch screen as characters or images. The power supply 190 may receive external power and internal power and provide power required for operations of the components of the electronic device 100 under control of the controller 180.

According to hardware implementation, embodiments may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or electrical units for executing functions. Embodiments may be implemented by the controller 180.

According to software implementation, embodiments such as procedures or functions may be implemented with a separate software module that executes at least one function or operation. Software codes may be implemented according to a software application written in an appropriate software language. The software codes may be stored in the memory 160 and executed by the controller 180.

Figure 2:
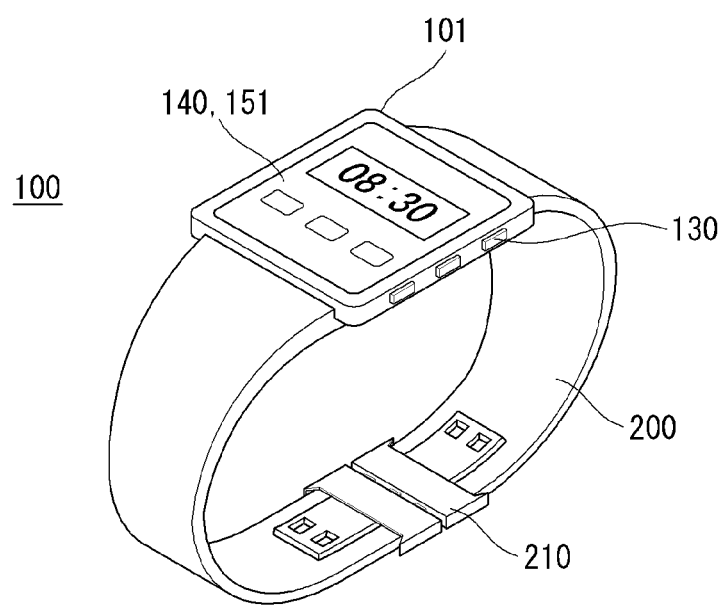
FIG. 2 is a perspective view showing an outer appearance of an electronic device with a wearable band according to an exemplary embodiment of the present disclosure.

FIG. 2 is a perspective view showing an example of the outer appearance of an electronic device 100 with a wearable band. The electronic device 100 includes a small body 101 with some or all of the components of FIG. 1 integrated therein, a band 200 connected to both edges of the small body 101, a means 210 (e.g., buckle or clasp) for tightening the band, and so on. A display screen of the display module 151 and a touch screen of the sensing unit 140, embedded in the display screen or installed on the display screen, may be disposed on the front of the small body 101. An input means, for example, a keypad, touchpad, or any other input means, of the input unit 130 may be disposed on the side of the small body 101. An antenna for receiving broadcast signals, as well as an antenna for mobile communication, may be located on the side of the small body 101, and the antenna(s) may be extractable from the small body 101.

The band 200 and the buckle 210 serve to secure the small body of the electronic device 100 onto the user's wrist, like a wrist watch. The band 200 may be made of resin, metal, natural/artificial leather, highly-stretchable material, or a combination thereof. The buckle 210 may be made of metal.

Figure 3:
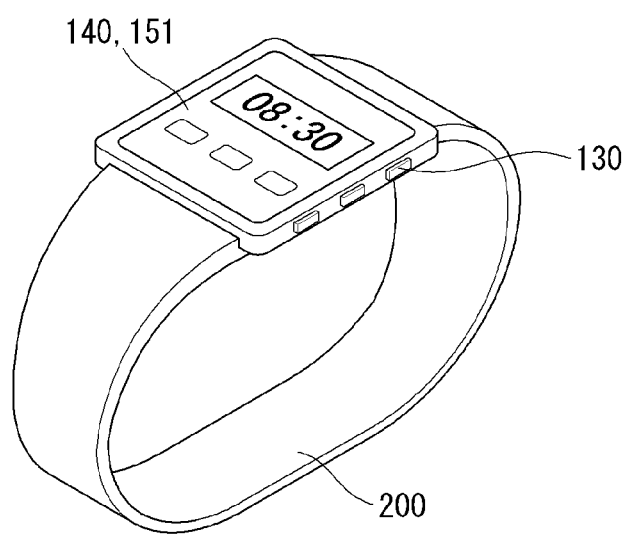
FIG. 3 is a perspective view showing another outer appearance of an electronic device with a wearable band according to an exemplary embodiment of the present disclosure.

Referring to FIG. 3, if the band 200 is made of highly-elastic material, the buckle 210 may be omitted. In this case, when the user pushes the band 200 up the forearm, the width and entire length of the band 210 may stretch, unlike when the user is wearing the electronic device around the wrist, due to the elasticity of the band 200.

The electronic device 100 may be fabricated to have such a special structure as the wristwatch illustrated in FIGS. 2 and 3. However, the present disclosure is not limited thereto and the electronic device 100 may be implemented in various other structures such as the existing bar type, or a slide type, a folder type, a swing type, a swivel type, etc which have two or more bodies coupled to be relatively movable.

In the electronic device with a wearable band to which the present disclosure applies, the band is not limited to the aforementioned buckle-type band, a band made of a material that stretches or contracts to a predetermined range, etc and may be modified in various ways.

For example, the band of the electronic device according to the embodiment of the present disclosure may include a first band part that is integral with the display 151 of the electronic device and extends to one end of the display 151, and a second band part that extends to the other end of the display 151. The first band part and the second band part may not be connected together. That is, a certain gap may be formed between the first band part and the second band part when the user wears the electronic device on the wrist.

As described above, it is needless to say that the shape of the electronic device to which the present disclosure applies is not limited to the example illustrated in FIGS. 2 and 3.

Figure 4:
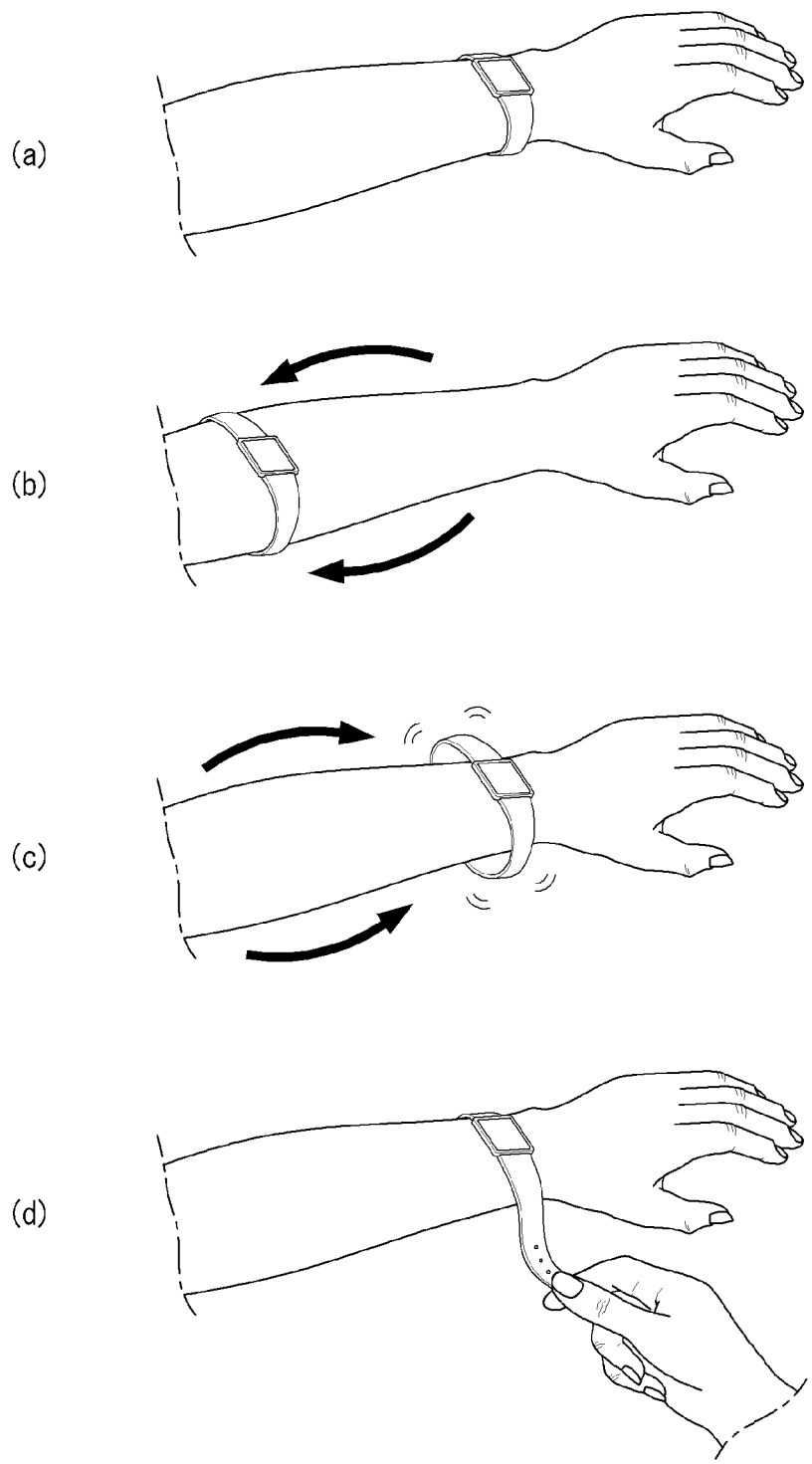
FIG. 4 is a view showing an example of the way how a watch phone is worn according to an exemplary embodiment of the present disclosure.

FIG. 4 is a view showing an example of the way how a watch phone is worn according to an exemplary embodiment of the present disclosure. The watch phone may include a wrist-wearable band. The band may be worn on the user's wrist, as in (a). Otherwise, the band may be worn on the user's forearm, as in (b). In this case, the band may be pushed up the forearm when it is loose on the wrist. Also, the band may be slid down to the wrist when it is less tight on the forearm, as in (c). The band may be tightened around the user's wrist, as in (d). Also, the band may be removed from the user's wrist.

The way of wearing the band of the electronic device according to the exemplary embodiment of the present disclosure is worn is not limited to the above example illustrated in FIG. 4. For example, FIG. 4 illustrates that the band is worn on the wrist and the forearm, the position where the band is worn is not limited to these examples so long as the band is worn on some part of the user's body and can implement specific functions.

Moreover, as illustrated in FIG. 4, the tightness of the wrist-wearable band according to the exemplary embodiment of the present disclosure may differ depending on where the band is worn (the wrist or forearm).

To detect the tightness of the band, the electronic device according to the exemplary embodiment of the present disclosure may further include a sensing unit capable of detecting the tightness of the band.

Figure 5:
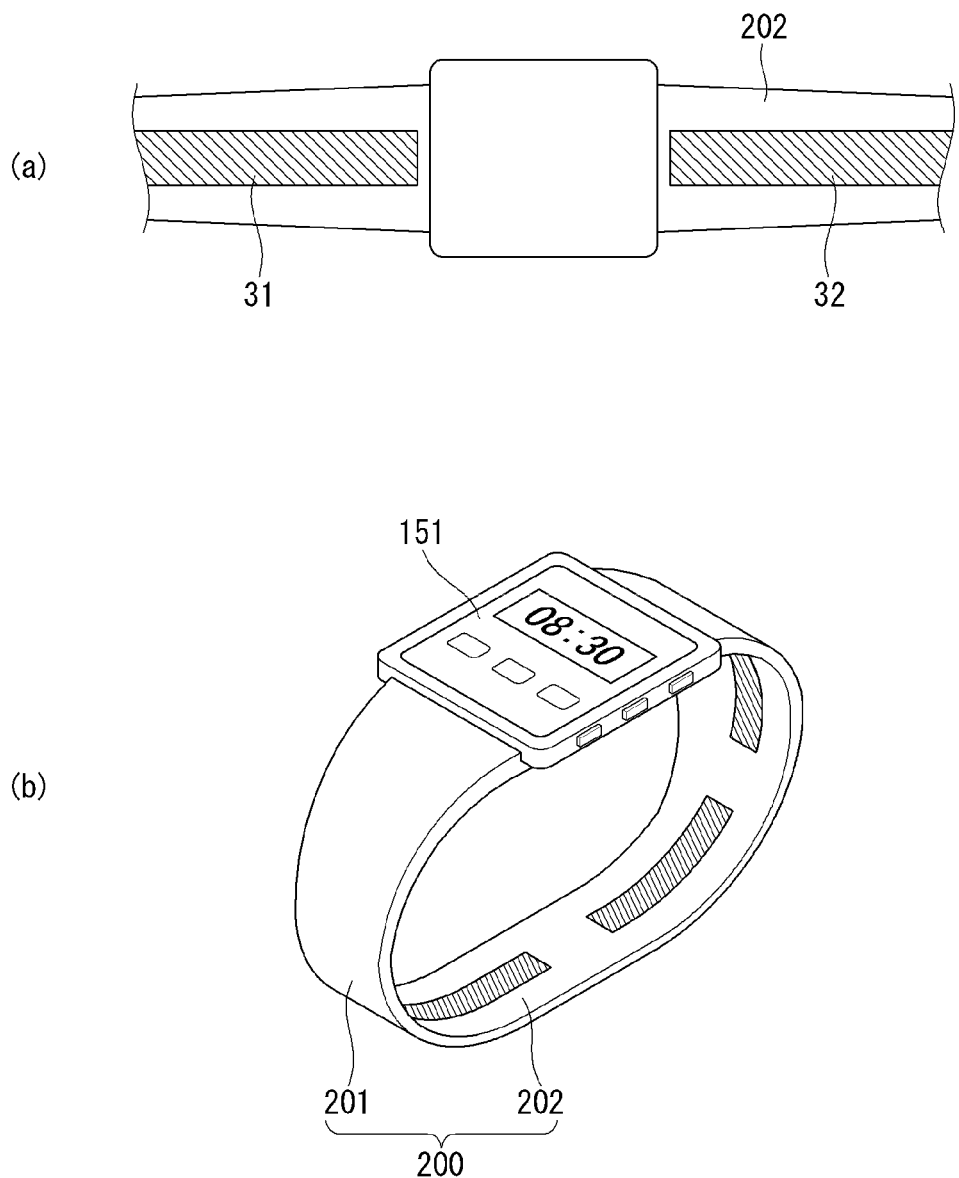
FIG. 5 is a view showing an example of a means for detecting the way the watch phone of FIG. 4 is worn.

FIG. 5 is a view showing an example of a means for detecting the way the watch phone of FIG. 4 is worn. Sensing units 31 and 32 (or sensors) may sit on at least part of the inner side 202 of the band, and can detect an object's surface. That is, when the user wears the electronic device 100, at least one of the sensing units 31 and 32 may detect the area of contact with the user's body.

Referring again to FIG. 4, the contact area in (a) of FIG. 4 detected by the sensing units 31 and 32 may be smaller than the contact area in (b) of FIG. 4 detected by them. This is because the wrist is normally thinner than the forearm.

Referring to FIGS. 4 and 5, if the band 200 is made of elastic material, the entire length of the band 200 may stretch when pushing the band on the wrist up the forearm, because of its elastic material. The sensing units 31 and 32, also made of elastic material, may stretch as the band 200 stretches.

Figure 6:
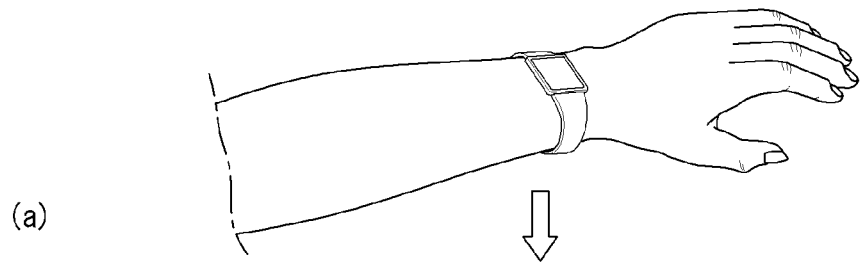
FIG. 6 is a view showing an example of changes in the width of the band depending on the way the watch phone of FIG. 4 is worn.
Figure 6:
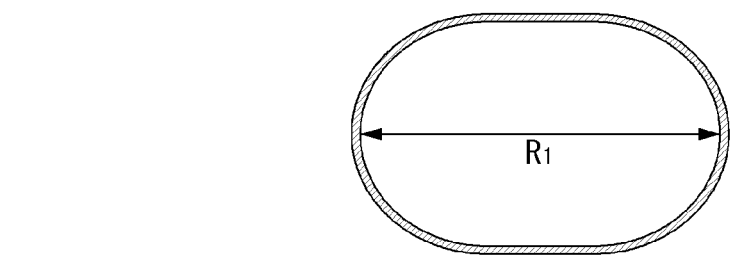

The width of the band may differ depending on where the band is worn (the wrist or forearm). FIG. 6 is a view showing an example of changes in the width of the band depending on the way the watch phone of FIG. 4 is worn. When the band of the wristwatch type electronic device 100 is worn on the wrist, the overall shape of the band may be an ellipse.

Here, the width R1 and R2 of the band may be one of the long axis (or major axis, transverse diameter) or short axis (or minor axis, conjugate diameter) of the ellipse when the band is worn on the user's wrist or forearm. The width R1 and R2 of the band may be the length of an axis other than the long axis or short axis that connects two opposite points on the ellipse through the center point.

As explained with reference to FIGS. 5 and 6, the electronic device 100 according to the exemplary embodiment of the present disclosure may detect the tightness of the band due to changes in the position of the band by means of a predetermined sensing unit. Also, the controller 180 of the electronic device 10 may detect a change in the position of the band as the width R1 and R2 of the band changes.

According to the present disclosure, a means of detecting the tightness or width of the band is not limited to those illustrated in FIGS. 5 and 6, and the tightness and/or width of the band may be detected by a variety of means.

Figure 7:
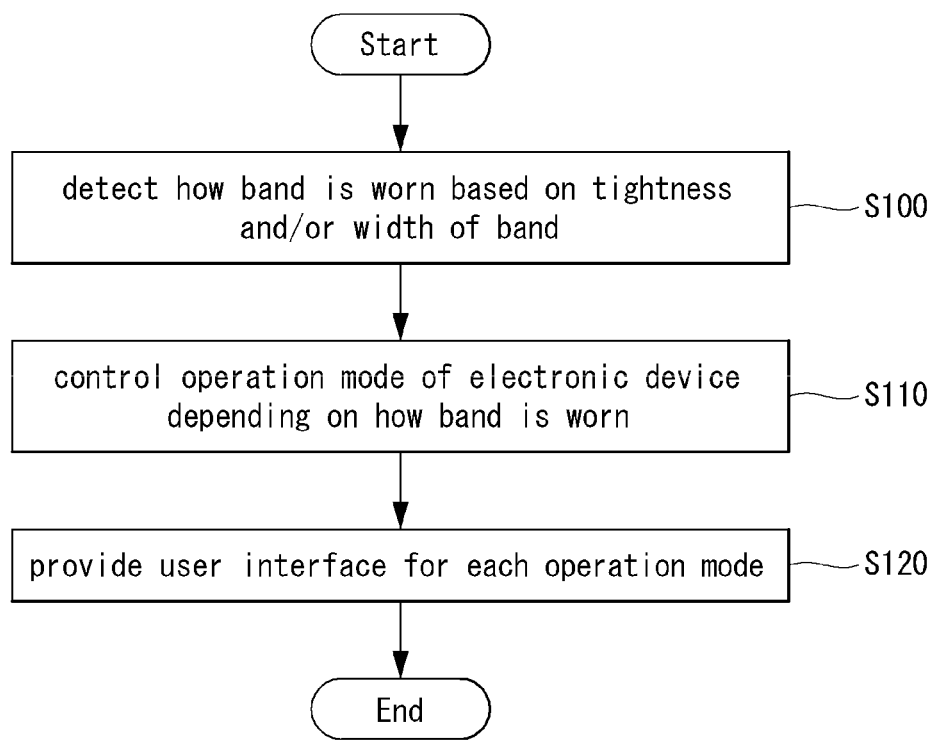
FIG. 7 is a flowchart of a method of controlling an electronic device according to an exemplary embodiment of the present disclosure.

FIG. 7 is a flowchart of a method of controlling an electronic device according to an exemplary embodiment of the present disclosure. The controller 180 of the electronic device 100 with a wearable band may detect the way the band is worn, based on the tightness of the band and/or the width of the band, in step S100.

The way the band is worn may denote the position where the band is worn. The controller 118 may distinguish between a first way in which the band is worn on the user's wrist and a second way in which the band is worn on the user's forearm.

The band may include a sensing unit which is provided in at least part of the inner side of the band and capable of detecting the area of contact between the band and the user's body. The controller 180 may detect the tightness of the band based on the area of contact.

That is, if the area of contact with the user's body exists within a first area range, the controller 180 may detect that the band is worn on the wrist. For example, the area of contact with the wrist of a first user sensed by the sensing unit may range from S1 to S2, and the range of the area of contact with the first user's wrist may be stored in a memory. Accordingly, if the area of contact detected by the sensing unit exists within the range S1-S2 when the user is wearing the band, the controller 180 may detect that the band is on the wrist.

The way the band is worn may be detected based on the width of the band. For example, if the band is worn on the user's wrist and forms a predetermined ellipse, the width of the band may be the length of at least one of the long or short axes of the ellipse.

That is, if the width of the band is within a first range, the controller 180 may detect that the band is worn on the wrist, and if the width of the band is within a second range wider than the first range, the controller 180 may detect that the band is worn on the forearm. For example, the user may specify in advance that if the width of the band is between R11 and R12, the band should be detected as worn on the wrist and if the width of the band is between R21 and R22 which is greater than R11 and R12, the band should be detected as worn on the arm.

If the entire length of the band stretches due to its elasticity, the controller 180 may detect whether the band is actually on the wrist or the forearm by detecting in real time how much the width of the band changes.

Meanwhile, the controller 180 may control the operation mode of the electronic device 100 depending on the way the band is worn, in step S110. The operation mode of the electronic device 100 may include a mode for executing a specific application. For example, the controller 180 may display the execution screen of a previously-used application when the band is worn on the wrist. For example, when the band is pushed up the forearm from the wrist (that is, after considering at least one of the tightness and width of the band), the controller 180 may put the electronic device 100 into sport (workout) mode by automatically executing an application for checking momentum of the user.

As seen above, an example of controlling the operation mode of the electronic device 100 when the band is worn, based on where the band is worn, has been discussed. However, the present disclosure is not limited thereto. That is, there may be various criteria for controlling the operation mode of the electronic device 100.

For example, the band may be detected as having been removed, based on at least one of the tightness and width of the band. In this case, the controller 180 may put the electronic device 100 into at least one operation mode, including charge mode, power-saving mode, synchronous mode, or a mode for connecting with other electronic devices.

For another example, the controller 180 may change the operation mode of the electronic device, based on at least one of the length of time the band is worn, the time when the band is removed, and the length of time since removal of the band.

That is, according to the exemplary embodiment of the present disclosure, the controller 180 may control the operation mode based on time information, such as the length of time the band is worn, the time when the band is removed, etc, as well as changing the operation mode based on the tightness and width of the band of the electronic device 100 (a watch phone). For example, if the controller 180 judges that the band has not been worn for a predetermined period of time after removal of the band, the controller 180 may not change the operation mode.

Also, the electronic device 100 may be set to have a different operation mode depending on whether the band is worn in the morning or at night, for example. That is, the operation mode of the electronic device 100 may be controlled depending on the length of time the band is worn, the time when the band is removed, etc.

And, the controller 180 may provide a user interface for each operation mode through the display 151, in step S120. The user interface for each operation mode may be the execution screen of a predetermined application in each operation mode. Alternatively, the user interface may be an environmental setting screen for entering a specific operation mode.

Figure 8:
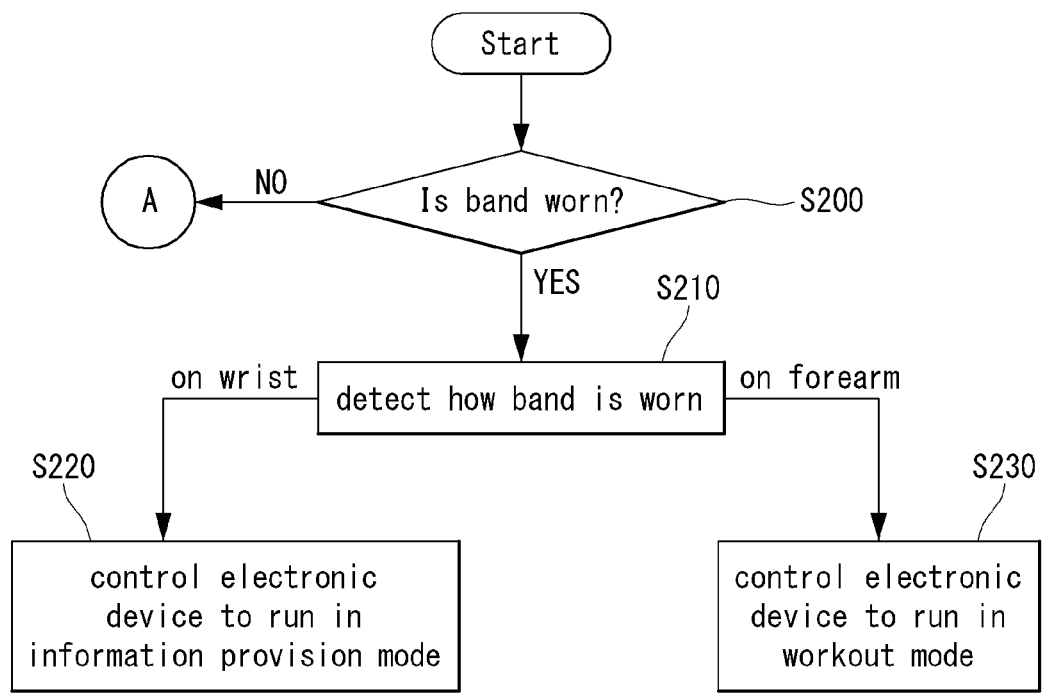
FIG. 8 is a flowchart for explaining in more detail S110 of FIG. 7.

FIG. 8 is a flowchart for explaining in more detail step S110 of FIG. 7. The controller 180 may determine whether the user is wearing the watch phone or not. That is, whether the band is worn or not may be detected by a change in the value sensed by the sensing unit equipped in the band or a change in the width of the band.

The controller 180 may find out in which mode the electronic device 100 is running when the band is not worn by the user. For example, the electronic device 100 may be in charge mode or power-saving mode when the band is not worn.

If the band is detected as worn by the user, the controller 180 may find out the way the band is worn. If the band is detected as worn on the wrist, the controller 180 may control the electronic device 100 to run in information provision mode, in step S220. And, if the band is detected as worn on the forearm, the controller 180 may control the electronic device 100 to run in workout mode, in step S230.

The information provision mode and the workout mode are only for illustration, and it is needless to say that the mode to be executed for each position may vary depending on whether the band is on the wrist or the forearm. Plus, if the band is on the wrist, the electronic device 100 may perform a function as an armband. That is, if the band is detected to be on the wrist, the controller 180 may activate a predetermined sensor to detect the user's body condition. The body condition comprises a health condition of the user.

A method of detecting the way the band is worn will be described with reference to the above explanation.

Figure 9:
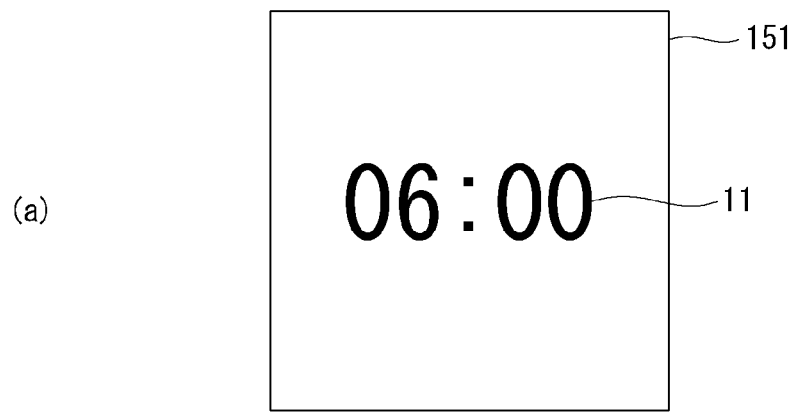
FIG. 9 is a view for explaining an example of controlling the operation mode of the electronic device based on the length of time wearing the electronic device, in addition to the way the electronic device is worn, according to the exemplary embodiment of the present disclosure.
Figure 9:
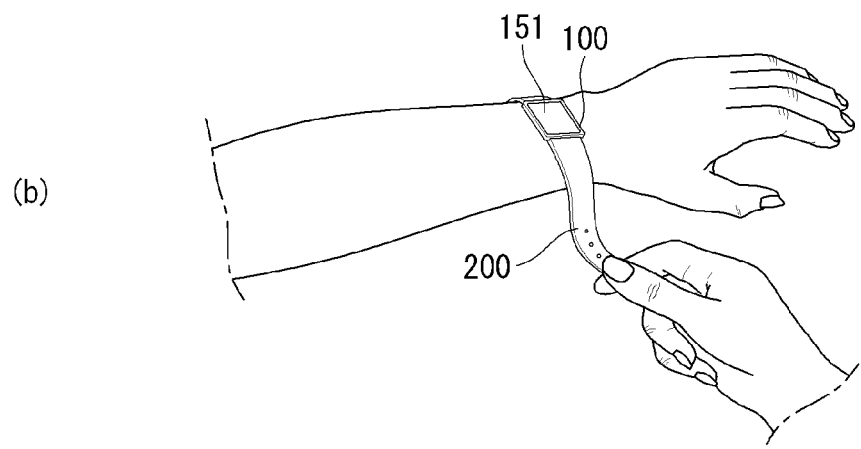
Figure 9:
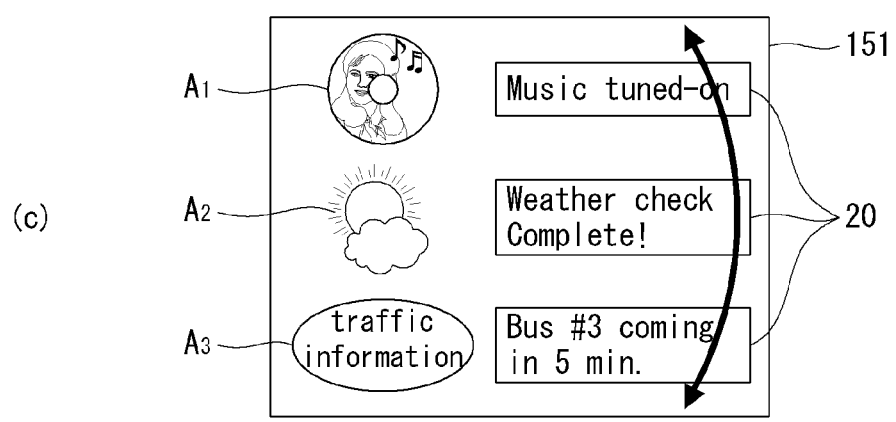

FIG. 9 is a view for explaining an example of controlling the operation mode of the electronic device based on the length of time wearing the electronic device, in addition to the way the electronic device is worn, according to the exemplary embodiment of the present disclosure. The controller 180 may detect the time 11 when the band is worn (a). In this example, the band is worn at 6 am. The mode used before the band was worn is charge mode or power-saving mode. When the band is worn (b), the controller 180 may switch the electronic device 100 from the power-saving mode or the charge mode to normal mode, based on the time when the band is worn.

The controller 180 may provide at least one application available in the normal mode. The controller 180 may recommend applications (e.g., a weather application A2, a music application A1, a traffic information application A3, or a calendar application) required to start the day, based on the time when the band is worn (c). The types and configuration of applications disclosed in (c) of FIG. 9 are only for illustration, and may be modified in various ways.

Figure 10A:
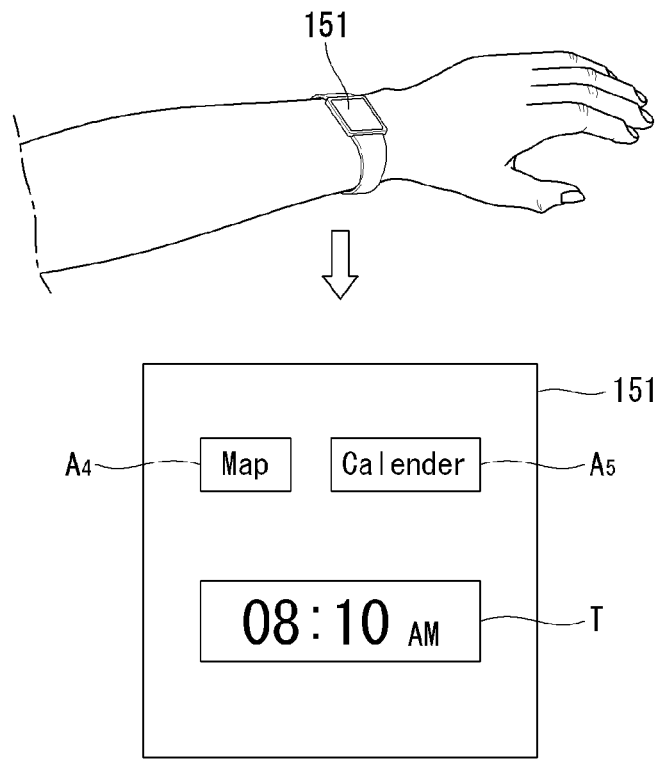
FIGS. 10A and 10B are views for explaining an example of an electronic device that provides a different function depending on whether the watch phone is worn on the wrist or the forearm.
Figure 10B:
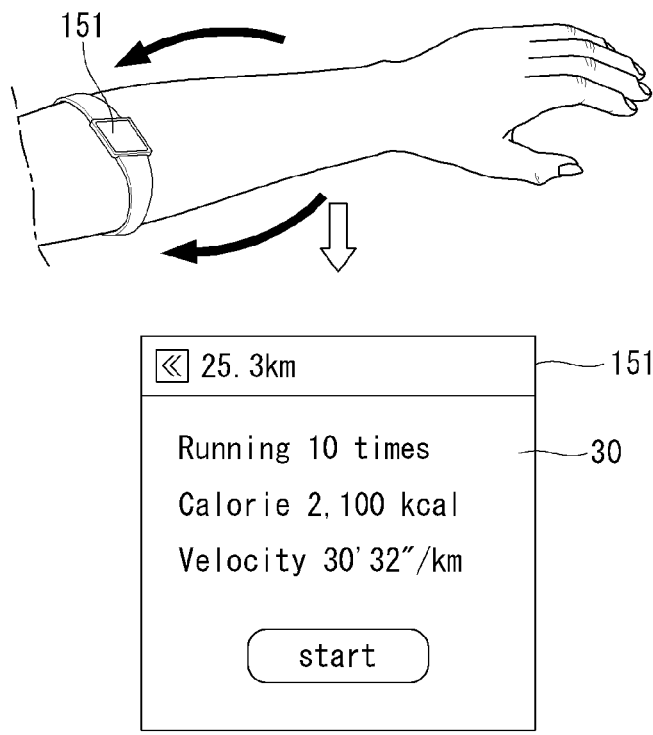

FIGS. 10A and 10B are views for explaining an example of an electronic device that provides a different function depending on whether the watch phone is worn on the wrist or the forearm. The electronic device 100 according to the exemplary embodiment of the present disclosure may switch to a different operation mode when the band is pushed up the forearm from the wrist or pulled down to the wrist from the forearm.

Referring to FIG. 10A, when the band is on the wrist, the electronic device 100 may provide information provision mode and a user interface for the information provision mode to the display 151. In the information provision mode, the user interface may provide various application icons A4 and A5 and time information T for performing watch phone functionality to the display 151.

Referring to FIG. 10B, when the band is on the forearm, the electronic device 100 may provide a user interface for workout mode to the display 151. In the sport (workout) mode, the user interface 30 may include distance run so far, number of runs, calories burned, average speed, etc.

Referring to FIG. 10A and FIG. 10B, when the band on the wrist is pushed up the forearm, the controller 180 may switch the operation mode of the electronic device 100 from the information provision mode of FIG. 10A to the workout mode of FIG. 10B, and provide a user interface for each mode through the display 151. The same may apply when the band on the forearm is pulled down to the wrist.

Accordingly, the electronic device 100 according to the exemplary embodiment of the present disclosure makes it easier to use the watch phone by detecting whether the watch phone is on the wrist or the forearm and if it is pushed up the forearm from the wrist or pulled down to the wrist from the forearm and executing an appropriate operation for each motion.

Figure 11:
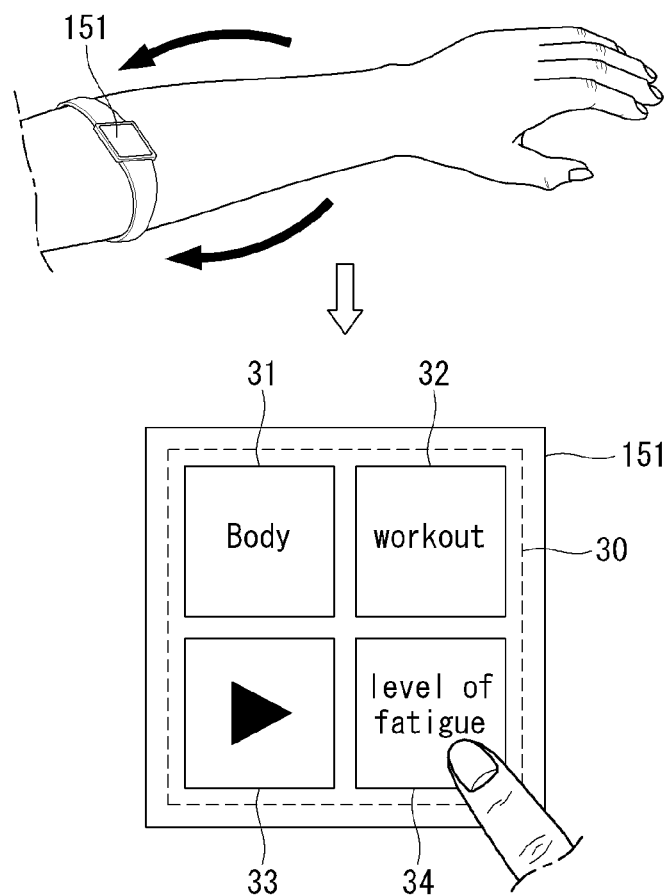
FIGS. 11 to 13 are views for explaining an example of a user interface provided through the electronic device when the electronic device is in workout mode.
Figure 12:
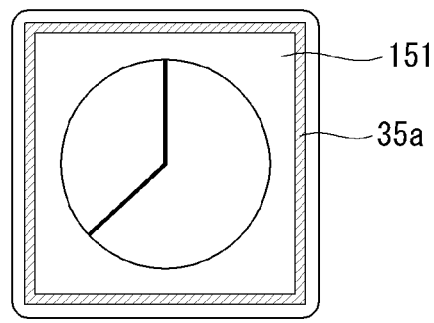
Figure 12:
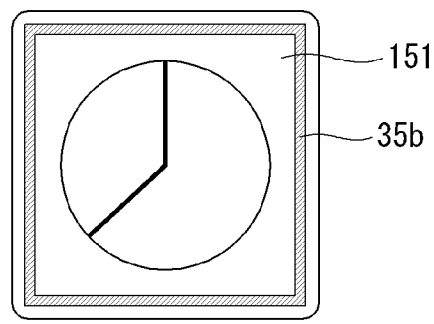
Figure 12:
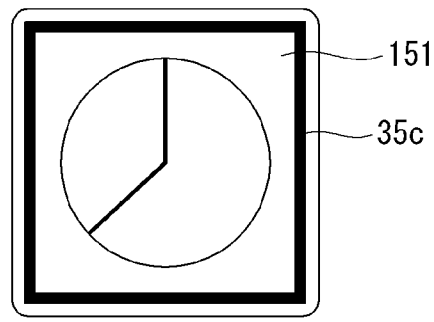
Figure 12:
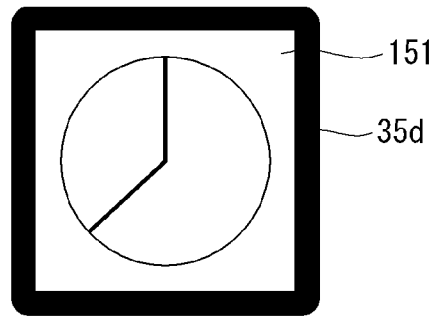
Figure 13:
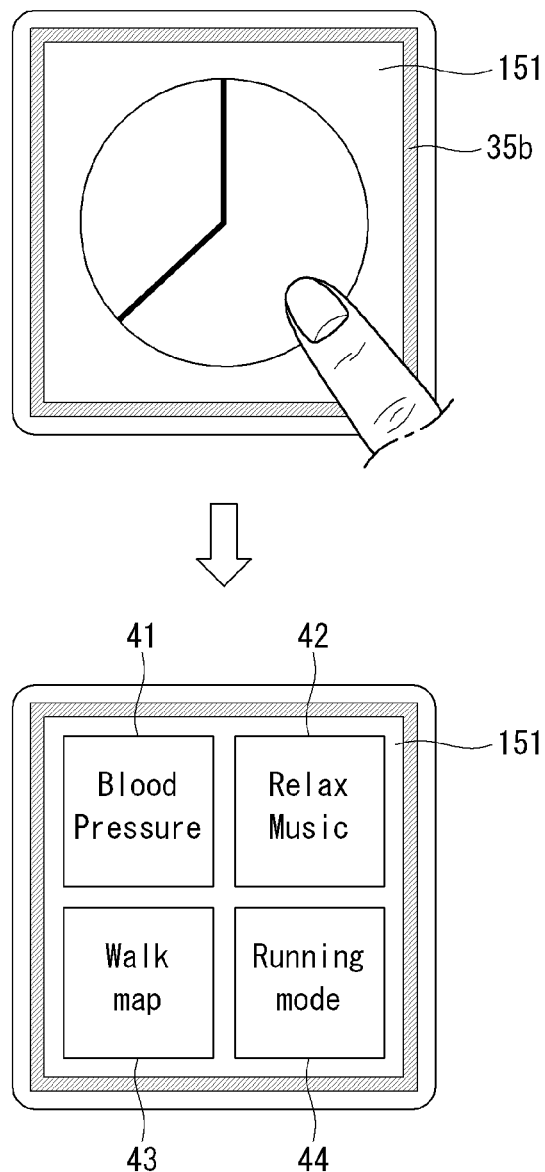

FIGS. 11 to 13 are views for explaining an example of a user interface provided through the electronic device when the electronic device is in workout mode. Referring to FIG. 11, if the electronic device 100 enters the workout mode as the band is on the forearm, the controller 180 may execute an application that can run in the workout mode, and display the execution screen 30 of the application on the display 151. The execution screen 30 of the application may include a function 31 for indicating the user's physical condition (e.g., blood pressure), a function 32 for checking workout information such as workout distance, workout time, and workout intensity, a function 33 for saving workout routes by activating the GPS module 115, and a function 34 for indicating the level of fatigue of the user in connection with the user's schedule saved in the calendar feature of the watch phone and information on the user's physical condition.

Referring to FIG. 12, the band may be worn on the forearm and perform the armband function. In this case, the electronic device 100 may provide a function for indicating the user's physical condition by controlling the color and thickness of backlights in a bezel area. For example, if the physical condition is normal and the user's schedule is moderate, the controller 180 may turn on a first bezel backlight 35a. If the body temperature, heart rate, and blood pressure are unstable and the user's schedule is tight, the controller 180 may turn on a second bezel backlight 35b. If a fourth bezel backlight 35d turns on, covering a third bezel backlight 35c, a message for emergency notification may be sent to a preset contact number. Here, the first bezel backlight 35a, the second bezel backlight 35b, the third bezel backlight 35c, the fourth bezel backlight 35d may have a different color respectively.

Referring to FIG. 13, upon receiving a touch input on the touch screen 151, when the user's physical condition is considered not good, based on the way the bezel backlights turn on after executing the armband function, the controller 180 may recommend appropriate applications 41, 42, 43, and 44 based on the physical condition.

Figure 14A:
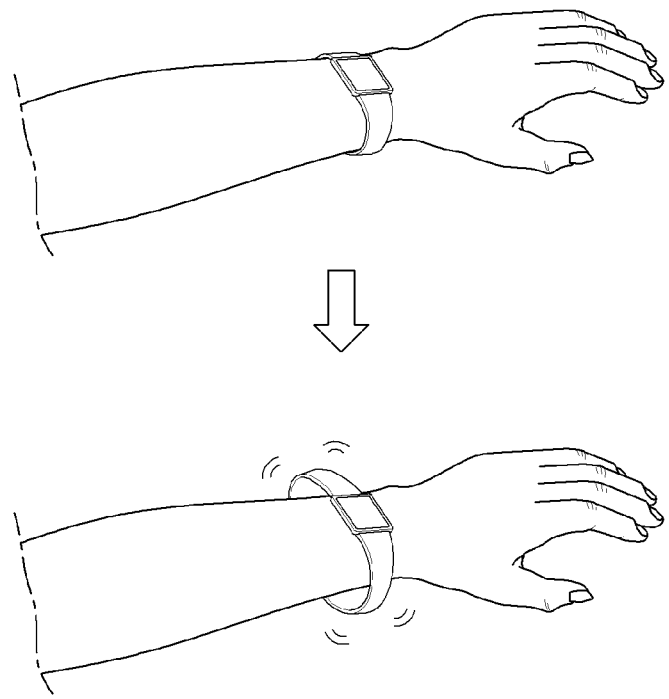
FIGS. 14A and 14B are views for explaining an example of controlling the operation mode of the electronic device when the band is less tight.
Figure 14B:
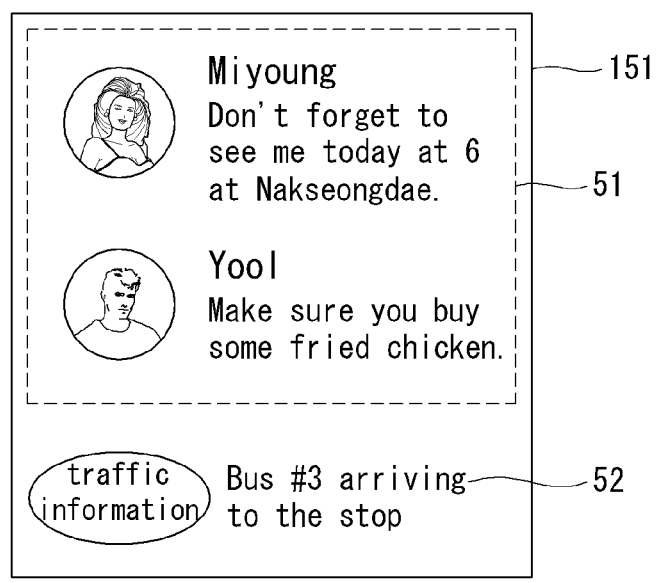

FIGS. 14A and 14B are views for explaining an example of controlling the operation mode of the electronic device when the band is less tight. If the band is less tight and the current time is considered as the time when the user leaves work, the controller 180 may operate in a predetermined after-work mode and provide SNS feed 51, music information, traffic information 52, etc.

Figure 15A:
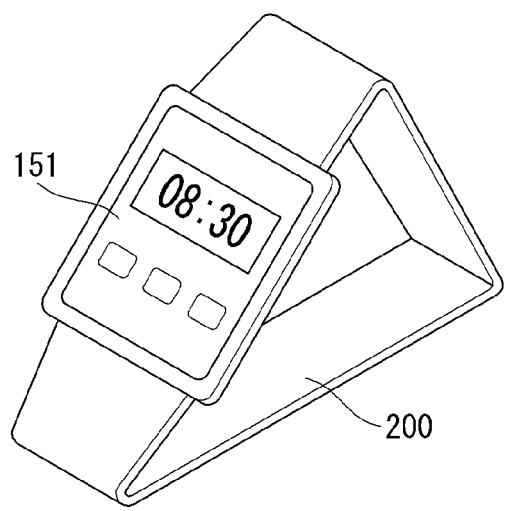
FIGS. 15A and 15B are views for explaining an example of controlling the operation mode of the electronic device, depending on the position in which the band is placed after the band is removed.
Figure 15B:
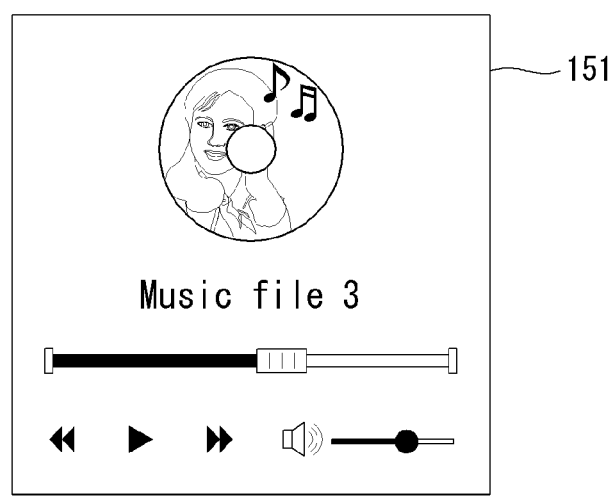

FIGS. 15A and 15B are views for explaining an example of controlling the operation mode of the electronic device, depending on the position in which the band is placed after the band is removed. When the band is placed in a standing position after the watch phone is removed, the band may be considered as a cradle. Therefore, the electronic device 100 may play music (FIG. 15B), enter power-saving watch mode, or provide weather information.

Alternatively, the electronic device 100, taking the form of a cradle, may detect a peripheral external device in order to use it as a speaker, and may control the way the backlights turn on so as to indicate the direction of a detected external device. Alternatively, when the band is placed in a standing position, the band may operate as a hot spot that offers internet access to other peripheral devices.

Figure 16A:
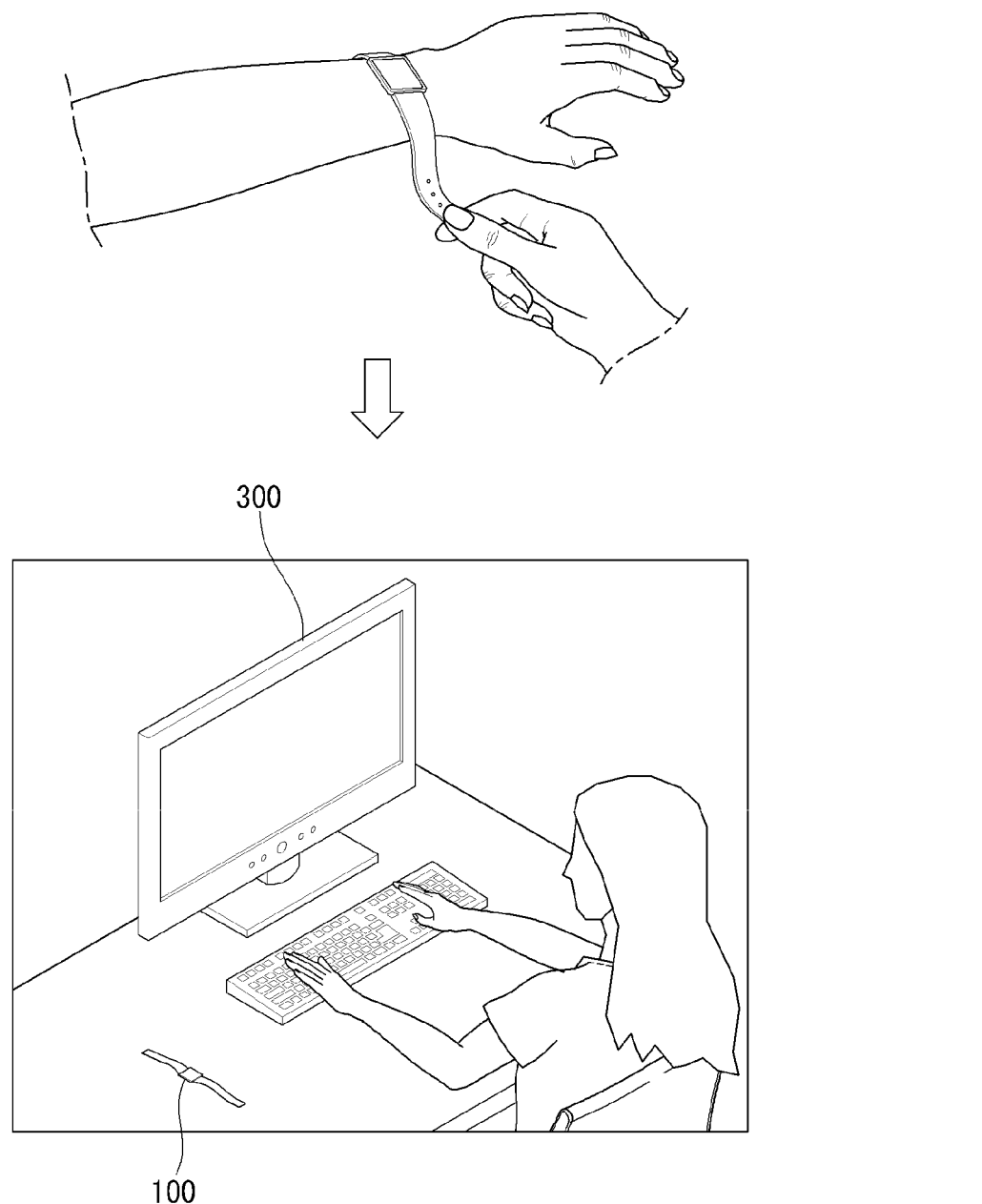
FIGS. 16A to 16C are views for explaining an example of executing the function for allowing the electronic device to share the screen with other external electronic devices when the band is removed.
Figure 16B:
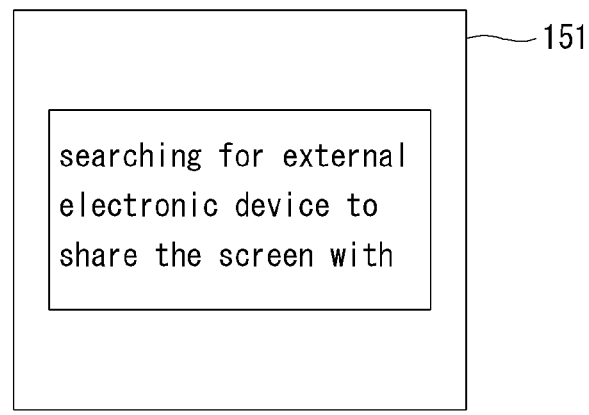
Figure 16C:
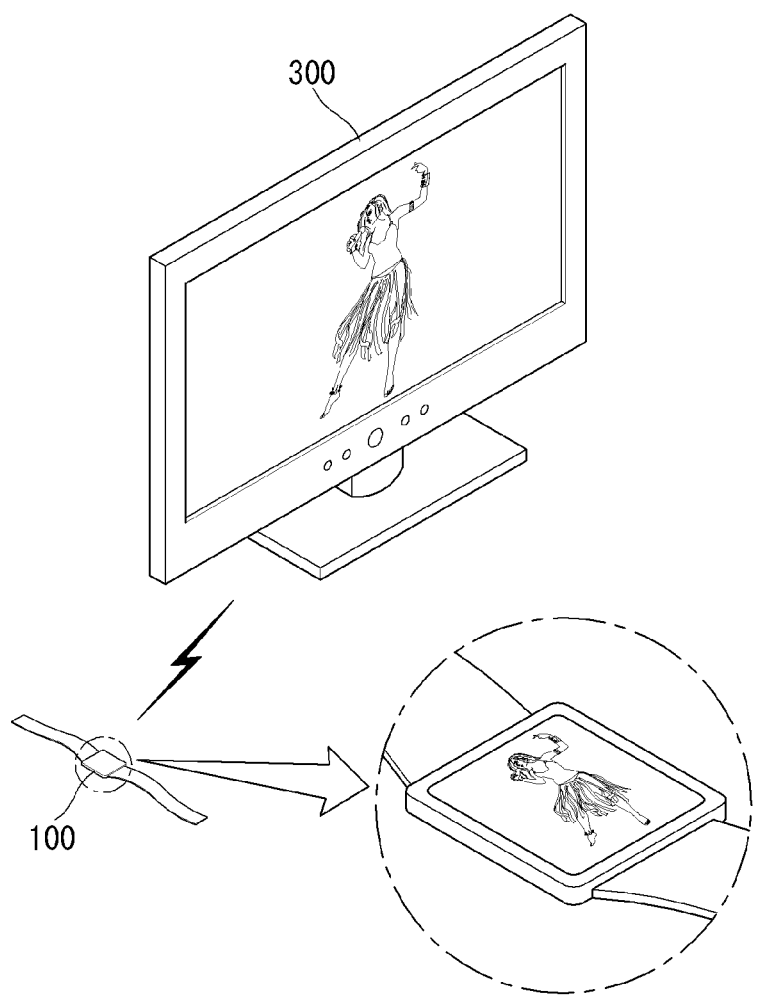

FIGS. 16A to 16C are views for explaining an example of executing the function for allowing the electronic device to share the screen with other external electronic devices when the band is removed. If the user takes off the band and put it down, the controller 180 may enter power-saving mode or charge mode or detect peripheral devices for the watch phone. When detecting an external electronic device 300 with a wide screen, the controller 180 may connect the screen of the watch phone and the screen of the external electronic device over a network.

Afterwards, the controller 180 may get the screen of the watch phone to be mirrored on the screen of the external electronic device 300. Referring to FIG. 16B, the controller 180 may provide a popup message to the display 151 to indicate that it is searching for an external electronic device to share the screen with.

Figure 17:
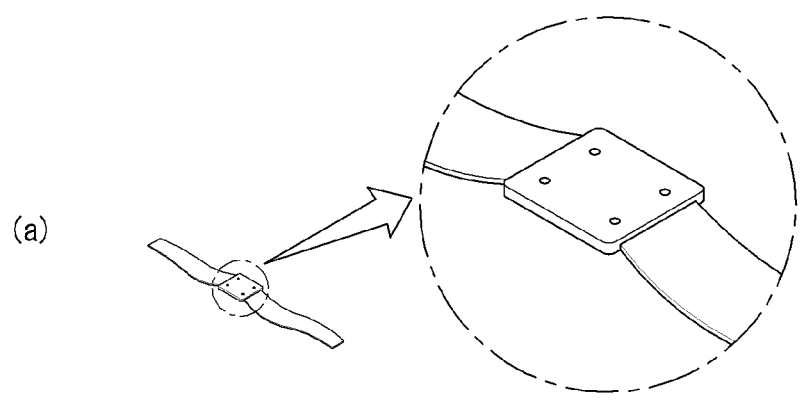
FIG. 17 is a view for explaining another example of controlling the operation mode of the electronic device depending on the way the band is placed when the band is removed.
Figure 17:
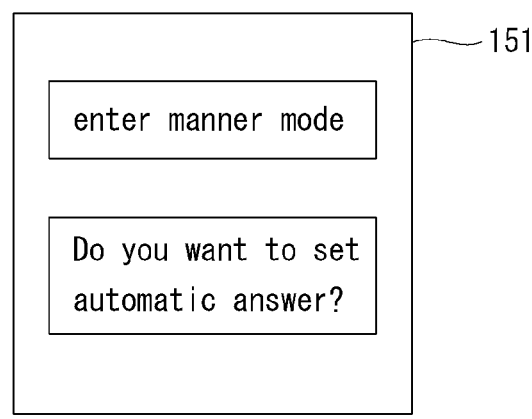

FIG. 17 is a view for explaining another example of controlling the operation mode of the electronic device depending on the way the band is placed when the band is removed. The controller 180 may set the electronic device to a different operation mode depending on the way the band is placed when the band is removed, and may store the setting information in the memory 160.

For example, when the band is removed and the display 151 of the electronic device 100 is placed face down, the controller 180 may control the electronic device 100 to operate in manner mode or privacy mode. Once in the manner mode, the controller 180 may provide an inquiry window asking to set an automatic answer to incoming calls. Needless to say, the setting information depending on the way the band is placed, as well as the type of calls to be screened, etc., can be changed as the user wants.

Figure 18:
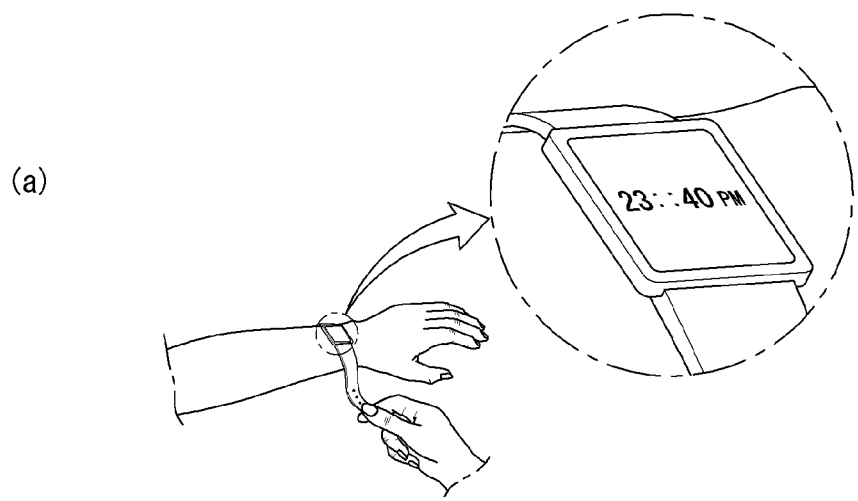
FIG. 18 is a view for explaining an example of controlling the operation mode of the electronic device based on the time when the band is removed.
Figure 18:
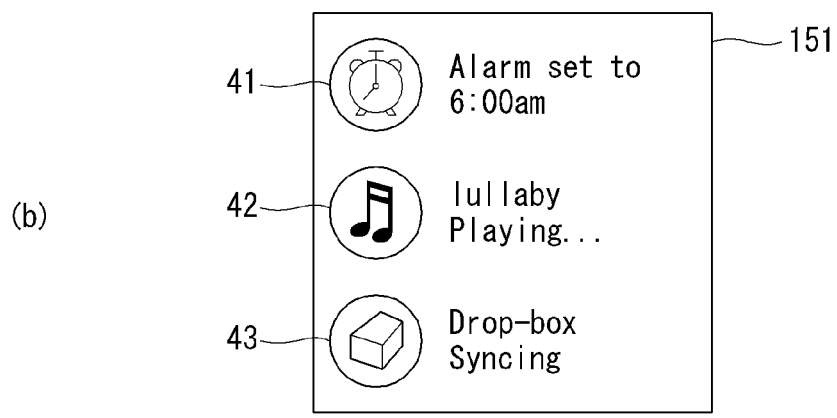
Figure 18:
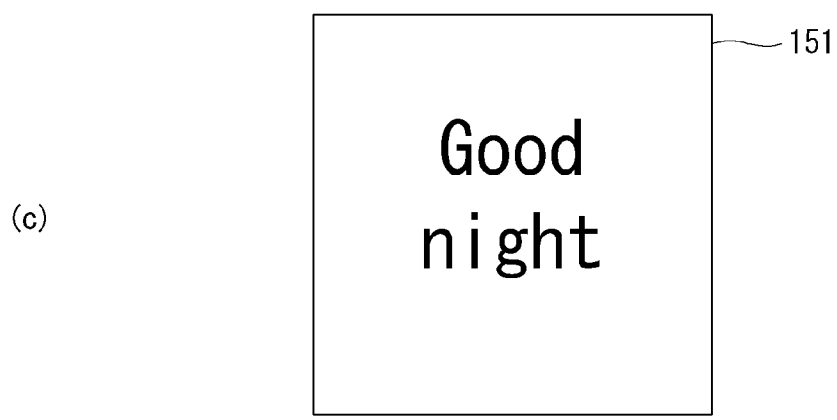

FIG. 18 is a view for explaining an example of controlling the operation mode of the electronic device based on the time when the band is removed. If the band is removed after a specified time (e.g., 10 pm), the controller 180 may enter a specified mode (e.g., after-work mode) and display at least one available application 41, 42, or 42 on the display 151.

Moreover, if the band is removed after a specified time, the controller 180 may control the electronic device 100 to operate in charge mode, power-saving mode, or synchronous mode for data backup.

Figure 19:
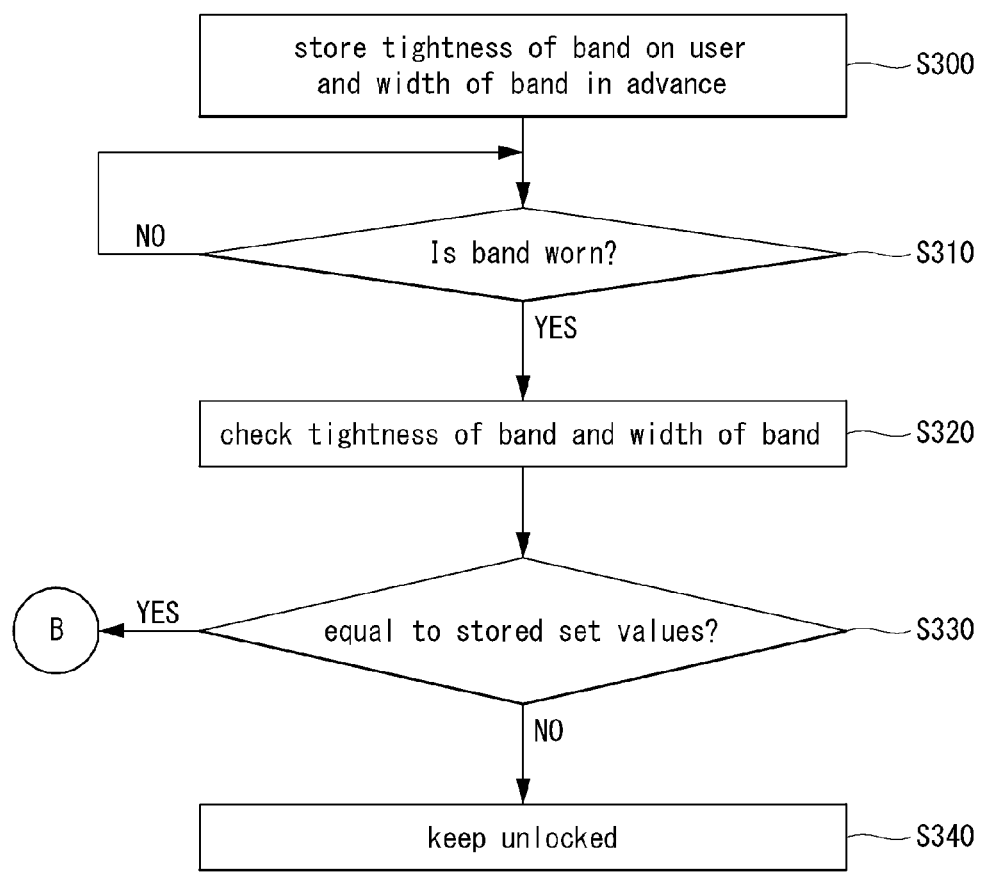
FIG. 19 is a flowchart of a method of controlling an electronic device according to another exemplary embodiment of the present disclosure.

FIG. 19 is a flowchart of a method of controlling an electronic device according to another exemplary embodiment of the present disclosure.

The controller 180 may set the tightness of the band on the user and the width of the band and store them in the memory 160 in advance, in step S300.

The controller 180 may check whether the band is worn or not, in step S310, and upon finding out that the user is wearing the band, check the tightness of the band and the width of the band, in step S320.

Whether the user is wearing the band or not and the tightness and width of the band after the band is worn may be detected by the above-described method.

If the tightness and width of the band are equal to the stored set values, in step S330, the controller 180 may judge the person wearing the band to be the owner of the electronic device 100. Otherwise, the controller 180 may enter safe mode and control the electronic device 100 so as to keep it from being unlocked in the safe mode, in step S340.

Figure 20:
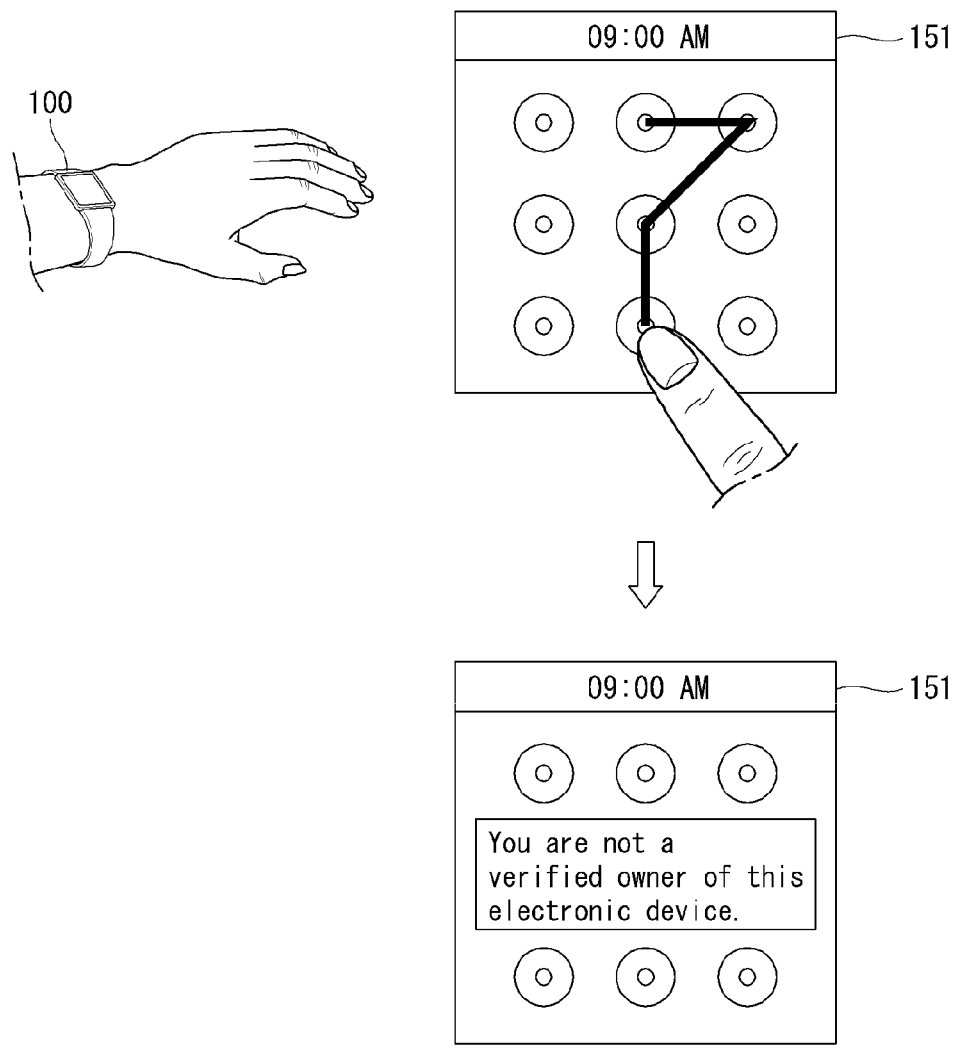
FIG. 20 is a view for explaining the exemplary embodiment illustrated in FIG. 19.

FIG. 20 is a view for explaining the exemplary embodiment illustrated in FIG. 19. For example, in case others are wearing the watch phone 100, the tightness of the band on them and the width of the band may be detected and compared with preset values, whereby they may turn out to be not the owner of the watch phone 100. In locked mode, the controller 180 may control the electronic device 100 to be kept from being unlocked even if the unlocking pattern is entered.

Figure 21A:
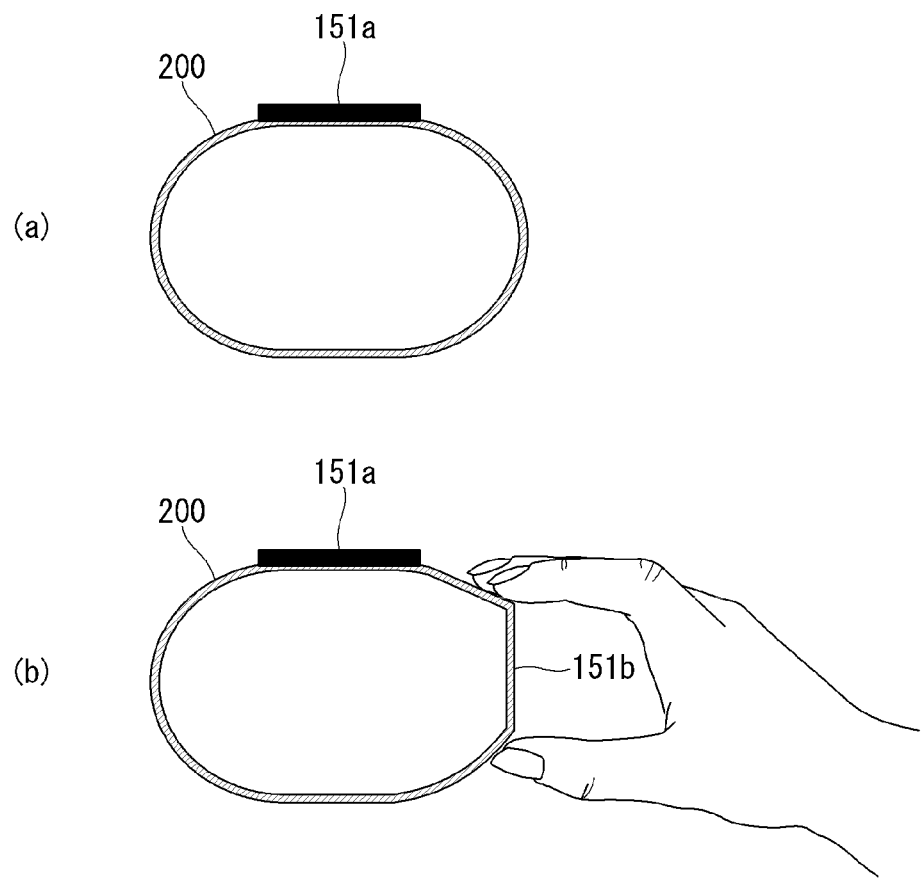
FIGS. 21A and 21B are views for explaining an example of adding a display depending on the way the band is worn.
Figure 21B:
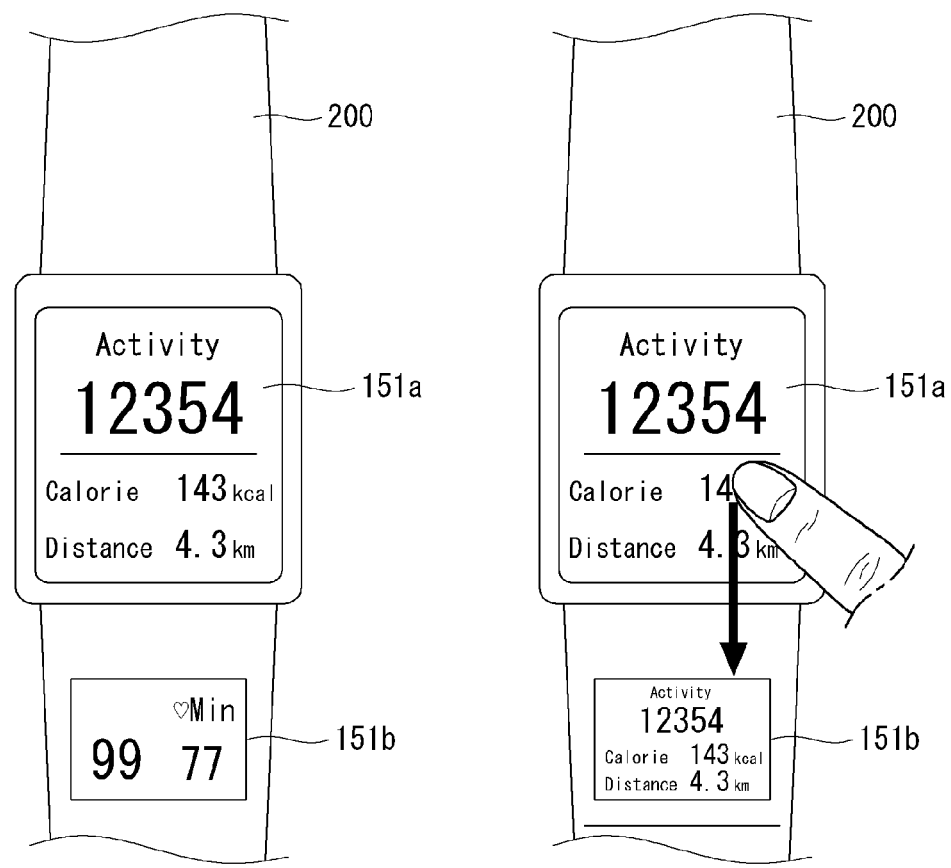

FIGS. 21A and 21B are views for explaining an example of adding a display depending on the way the band is worn. Referring to FIG. 21A, when the user is wearing the band of the electronic device 100, the band may form an ellipse-like shape so as to resemble the shape of the user's wrist. The band is supposed to form an elliptical shape (or oblong) normally when it is worn. Upon receiving a user input for forming a certain angle with the band, a sub display 151b equipped in the band 200, as well as a main display 151a of the electronic device 100, may be activated.

Referring to FIG. 21B, the controller 180 may provide content on the sub display 151b as well as on the main display 151a. Also, upon receiving a predetermined drag input on the content displayed on the main display 151a in the direction of the sub display 151b, for example, the content may be provided to the sub display 151b from then on.

Figure 22:
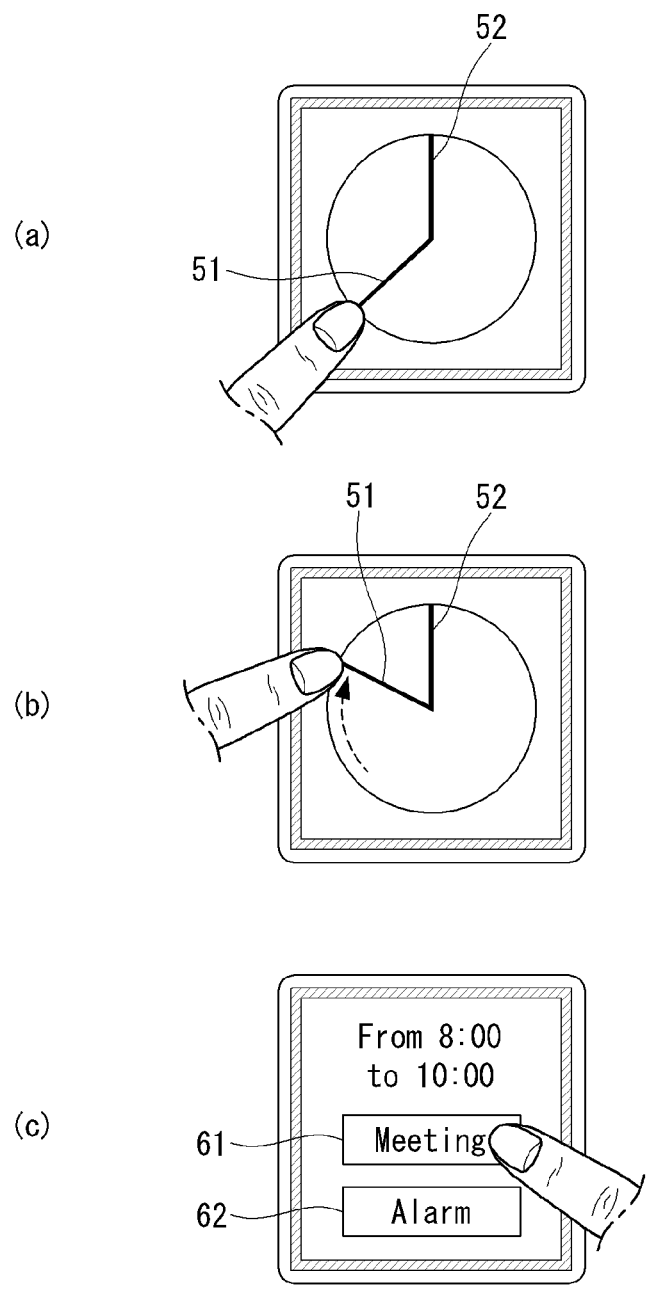
FIG. 22 is a view for explaining another example of controlling the electronic device in response to a user's gesture input when the band is worn.

FIG. 22 is a view for explaining another example of controlling the electronic device in response to a user's gesture input when the band is worn. The electronic device 100 according to the exemplary embodiment of the present disclosure may be an electronic device with watch phone functionality. Accordingly, the electronic device 10 may display a dial UI consisting of an hour hand 51 and a minute hand 52 on the display 151 (*a*).

Therefore, the user may enter schedule information using the dial UI. For example, dragging the hour hand 51 to a specific time (b) may provide user interfaces 61 and 62 that let the user to set a schedule for the period of time dragged on the display 151 (*d*).

An aspect of the present disclosure is to provide an electronic device with a wrist-wearable band which can make more efficient use of various applications and functions of watch phones by switching between different operation modes, depending on the way the band is worn on the wearer, and a method of controlling the same.

One exemplary embodiment of the present disclosure may provide an electronic device with a wearable band including: a display; and a controller configured to detect the way the band is worn, based on the tightness of the band and/or the width of the band, change the operation mode of the electronic device depending on the way the band is worn, and display a user interface corresponding to the operation mode.

The controller may be configured to distinguish between a first way in which the band is worn on the user's wrist and a second way in which the band is worn on the user's forearm.

The band may include a sensing unit for detecting the area of contact with the user's body, and the controller may be configured to detect the tightness of the band based on the area of contact.

If the area of contact with the user's body exists within a first area range, the controller may be configured to detect that the band is worn on the wrist, and if the area of contact with the user's body exists within a second area range wider than the first area range, the controller may be configured to detect that the band is worn on the forearm.

If the band is worn on the user's wrist and forms a predetermined ellipse, the width of the band may be the length of at least one of the long or short axes of the ellipse.

If the width of the band is within a first range, the controller may be configured to detect that the band is worn on the wrist, and if the width of the band is within a second range wider than the first range, the controller may be configured to detect that the band is worn on the forearm.

The operation mode of the electronic device may include a mode for executing a specific application, and if the band is detected as worn on the user's forearm, the controller may be configured to automatically execute an application for checking momentum of the user.

If the band is detected as removed, based on at least one of the tightness and width of the band, the controller may be configured to put the electronic device into at least one operation mode, including charge mode, power-saving mode, synchronous mode, or a mode for connecting with other electronic devices.

The controller may be configured to change the operation mode of the electronic device, based on at least one of the length of time the band is worn, the time when the band is removed, and the length of time since removal of the band.

The electronic device may further include a memory configured to store information on the tightness of the band on a specific user and the width of the band.

Moreover, the electronic device may have watch phone or smart phone functionality.

A method of controlling an electronic device with a wearable band according to another exemplary embodiment of the present disclosure may include: detecting the way the band is worn, based on the tightness of the band and/or the width of the band; controlling the operation mode of the electronic device depending on the way the band is worn; and displaying a user interface corresponding to the operation mode.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An electronic device comprising:
   a body;
   a display provided on the body;
   a band coupled to the body, a first portion of the band extending from a first side of the body and a second portion of the band extending from a second side of the body; and
   a controller configured to:
   detect that the band is worn at a first position of a user's body based on at least one of a tightness of the band or a width between the first and second portions of the band,
   select a first operation mode from among a plurality of operation modes corresponding to the first position based on a time when the band is worn to the first position,
   cause the display to display a first user interface corresponding to the first operation mode,
   detect that the band is moved to a second position of the user's body based on a change of the at least one of tightness or the width of the band,
   select a second operation mode from among a plurality of operation modes corresponding to the second position based on a time when the band is moved to the second position, and
   cause the display to display a second user interface corresponding to the second operation mode.

2. The electronic device of claim 1, wherein the band forms a loop and the width between the first and second portions of the band is a diameter of the band in a prescribed direction relative to the display.

3. The electronic device of claim 1, wherein the controller determines a manner in which the band is worn by a user based on the at least one of the tightness of the band or the width of the band when the band is worn by the user, and determines the operation mode based on the determined manner in which the band is worn.

4. The electronic device of claim 3, wherein the determined manner in which the band is worn includes a first manner in which the band is worn on the user's wrist and a second manner in which the band is worn on the user's forearm.

5. The electronic device of claim 4, wherein a sensor is provided on the band that senses an area of contact with the user's body, and the controller is configured to determine the tightness of the band based on the area of contact.

6. The electronic device of claim 5, wherein when the area of contact with the user's body is within a first prescribed range, the controller determines that the band is worn on the wrist, and when the area of contact with the user's body is within a second prescribed range that is wider than the first prescribed range, the controller determines that the band is worn on the forearm.

7. The electronic device of claim 4, wherein when the band is worn on the user's wrist and forms an oblong shape, the width of the band is a length of at least one of a long axis or a short axis of the band.

8. The electronic device of claim 7, wherein when the width of the band is within a first range, the controller determines the band to be worn on the wrist, and when the width of the band is within a second range that is wider than the first range, the controller determines the band to be worn on the forearm.

9. The electronic device of claim 1, wherein, based on the tightness or the width of the band,
when the controller determines the band to be worn on a user's wrist, the controller executes a first prescribed application in a watch mode,
when the controller determines the band to be worn on the user's forearm, the controller executes a second prescribed application in a workout mode, and
when the controller determines that the band is not worn by the user, the controller executes a third prescribed application in at least one of a charging mode, power-saving mode, synchronous mode, mode for connecting with other electronic devices, or multimedia playback mode.

10. The electronic device of claim 1, wherein the controller is configured to change the operation mode of the electronic device, based on at least one of a length of time the band is worn, a time when the band is removed, or a length of time since removal of the band.

11. The electronic device of claim 1, wherein the display is a flexible display.

12. The electronic device of claim 1, wherein the first and second portions of the band are formed integrally with each other to form a loop, or the first and second portions of the band are formed separately and connected to each other by a clasp, and wherein a plurality of sensors are provided on an inner surface of the first and second portions of the band.

13. The electronic device of claim 1, wherein the band is made of an elastic material, the entire length of which stretches according to the manner in which the band is worn by a user.

14. A method of controlling an electronic device having a wearable band, the method comprising:
detecting that the band is worn at a first position of a user's body based on at least one of a tightness of the band or a width between the first and second portions of the band;
selecting a first operation mode from among a plurality of operation modes corresponding to the first position based on a time when the band is worn to the first position;
displaying a first user interface corresponding to the first operation mode;
detecting that the band is moved to a second position of the user's body based on a change of the at least one of tightness or the width of the band;
selecting a second operation mode from among a plurality of operation modes corresponding to the second position based on a time when the band is moved to the second position; and
displaying a second user interface corresponding to the second operation mode.

15. The method of claim 14, wherein the determining the manner in which the band is worn includes
detecting, at a sensor, an area of contact between the band and the user's body, and
determining a tightness of the band around the user based on the area of contact.

16. The method of claim 14, wherein when the band is worn on the user's wrist, the width of the band is a diameter of the loop along a long axis or a short axis of the loop.

17. The method of claim 14, wherein in the controlling the operation mode of the electronic device, when the band is determined to be worn on the user's forearm, an application for checking a momentum of the user is automatically executed.

18. The method of claim 14, wherein in the controlling the operation mode of the electronic device, when the band is determined as not being worn by the user based on at least one of the tightness or the width of the band, the electronic device is placed in at least one of a charge mode, a power-saving mode, a synchronous mode, or a mode for connecting with other electronic devices.

19. The method of claim 14, wherein in the controlling the operation mode of the electronic device, the controller changes the operation mode of the electronic device based on at least one of a length of time the band is worn, a time when the band is removed, or a length of time since removal of the band.

20. The method of claim 14, further comprising, when a prescribed user is wearing the band, storing information on a tightness of the band and a width of the band associated with the prescribed user.

* * * * *